US010028307B2

(12) United States Patent
Lee et al.

(10) Patent No.: US 10,028,307 B2
(45) Date of Patent: Jul. 17, 2018

(54) CONFIGURABLE ACCESS STRATUM SECURITY

(71) Applicant: QUALCOMM Incorporated, San Diego, CA (US)

(72) Inventors: Soo Bum Lee, San Diego, CA (US); Keiichi Kubota, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/188,704

(22) Filed: Jun. 21, 2016

(65) Prior Publication Data

US 2017/0202033 A1 Jul. 13, 2017

Related U.S. Application Data

(60) Provisional application No. 62/278,335, filed on Jan. 13, 2016.

(51) Int. Cl.
*H04M 1/66* (2006.01)
*H04W 36/00* (2009.01)
(Continued)

(52) U.S. Cl.
CPC ........... *H04W 76/02* (2013.01); *H04L 63/205* (2013.01); *H04W 8/22* (2013.01); *H04W 12/04* (2013.01);
(Continued)

(58) Field of Classification Search
CPC ..... H04W 12/00; H04W 12/07; H04W 12/04; H04W 12/06; H04W 12/08; H04W 12/10; H04W 12/12; H04W 36/0038
(Continued)

(56) References Cited

U.S. PATENT DOCUMENTS 8,107,437 B2 1/2012 De et al.
9,125,137 B2 9/2015 Kim et al.
(Continued)

FOREIGN PATENT DOCUMENTS

EP 2579635 A2 4/2013
EP 2590470 A1 5/2013

OTHER PUBLICATIONS

ISA/EP, International Search Report and Written Opinion of the International Searching Authority, Int'l Application No. PCT/US2016/066091, dated Feb. 10, 2017, European Patent Office, Rijswijk, NL, 11 pgs.

*Primary Examiner* — Huy C Ho
(74) *Attorney, Agent, or Firm* — Holland & Hart, LLP

(57) ABSTRACT

Techniques are described for wireless communication. A method for wireless communication at a user equipment (UE) includes establishing a connection with a network node; receiving from the network node, as part of establishing the connection, an AS security indication indicating an AS protocol layer for protecting data packets; and configuring AS security protection for data packets based at least in part on the AS security indication and the indicated AS protocol layer. A method for configuring AS security includes establishing a connection with a UE; receiving from a network access device controller, as part of establishing the connection, an AS security indication indicating an AS protocol layer for protecting data packets; and configuring AS security protection for data packets transmitted to or received from the UE based at least in part on the AS security indication and the indicated AS protocol layer.

30 Claims, 25 Drawing Sheets

(51) Int. Cl.
*H04W 76/02* (2009.01)
*H04W 8/22* (2009.01)
*H04W 12/04* (2009.01)
*H04W 12/08* (2009.01)
*H04W 36/08* (2009.01)
*H04W 76/10* (2018.01)
*H04W 4/00* (2018.01)
*H04W 74/08* (2009.01)
*H04L 29/06* (2006.01)
*H04W 12/02* (2009.01)
*H04W 76/00* (2018.01)

(52) U.S. Cl.
CPC ....... *H04W 12/08* (2013.01); *H04W 36/0038* (2013.01); *H04W 36/08* (2013.01); *H04W 76/10* (2018.02); *H04L 63/0428* (2013.01); *H04W 12/02* (2013.01); *H04W 74/08* (2013.01); *H04W 76/00* (2013.01)

(58) Field of Classification Search
USPC .......................................... 455/411
See application file for complete search history.

(56) References Cited

U.S. PATENT DOCUMENTS

| | | |
|---|---|---|
| 2002/0147021 A1 | 10/2002 | June |
| 2009/0111423 A1 | 4/2009 | Somasundaram et al. |
| 2011/0159841 A1* | 6/2011 | Escott ................ H04W 12/04 455/410 |
| 2013/0301611 A1* | 11/2013 | Baghel ................ H04W 72/04 370/331 |
| 2014/0056243 A1 | 2/2014 | Pelletier et al. |
| 2015/0143463 A1* | 5/2015 | Baghel ................ H04W 12/02 726/3 |
| 2016/0105800 A1 | 4/2016 | Patil et al. |

* cited by examiner

CONFIGURABLE ACCESS STRATUM SECURITY

CROSS REFERENCES

The present Application for Patent claims priority to U.S. Provisional Patent Application No. 62/278,335 by Lee, et al., entitled "CONFIGURABLE ACCESS STRATUM SECURITY," filed Jan. 13, 2016, assigned to the assignee hereof.

BACKGROUND

Field of the Disclosure

The present disclosure, for example, relates to wireless communication systems, and more particularly to configurable access stratum (AS) security.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In other examples (e.g., in a next generation or 5G network), a wireless multiple-access communication system may include a number of network access devices in communication with associated network access device controllers (e.g., access node controllers (ANCs)), where a set of one or more network access devices, in communication with a network access device controller, may define a network node. A base station or network access device may communicate with a set of UEs on downlink channels (e.g., for transmissions from a base station or network access device to a UE) and uplink channels (e.g., for transmissions from a UE to a base station or network access device).

Due to the nature of some next generation or 5G networks, in which traffic to and from a plurality of network access devices is routed through a single network access device controller, a performance bottleneck may arise at the network access device controller.

SUMMARY

The present disclosure, for example, relates to configurable AS security. Some of the factors that may lead to a performance bottleneck arising at an ANC (or other types of network access device controller) are congestion and/or high throughput on one or more of the communication links between the network access device controller and one or more of radio heads (or other types of network access devices) associated with the network access device controller. Other factors that may lead to a performance bottleneck arising at a network access device controller include heavy use of the network access device controller's resources and/or an increase of the computational overhead at the network access device controller.

When a large number of data packets need to be processed by a network access device controller, a part of the computational overhead at the network access device controller relates to AS security protection processing for the data packets. Techniques described in the present disclosure provide configurable AS security, in which some of the processing associated with providing AS security protection may be offloaded to the network access devices associated with a network access device controller, thereby mitigating the likelihood of a performance bottleneck arising at the network access device controller.

A method for wireless communication at a UE is described. The method may include: establishing a connection with a network node; receiving from the network node, as part of establishing the connection, an AS security indication indicating an AS protocol layer for protecting data packets; and configuring AS security protection for data packets based at least in part on the AS security indication and the indicated AS protocol layer.

An apparatus for wireless communication at a UE is described. The apparatus may include a processor, memory in electronic communication with the processor, and instructions stored in the memory. The instructions may be executable by the processor to: establish a connection with a network node; receive from the network node, as part of establishing the connection, an AS security indication indicating an AS protocol layer for protecting data packets; and configure AS security protection for data packets based at least in part on the AS security indication and the indicated AS protocol layer.

Another apparatus for wireless communication at a UE is described. The apparatus may include: means for establishing a connection with a network node; means for receiving from the network node, as part of establishing the connection, an AS security indication indicating an AS protocol layer for protecting data packets; and means for configuring AS security protection for data packets based at least in part on the AS security indication and the indicated AS protocol layer.

A non-transitory computer-readable medium for wireless communication at a UE is described. The non-transitory computer-readable medium may be executable by a processor to: establish a connection with a network node; receive from the network node, as part of establishing the connection, an AS security indication indicating an AS protocol layer for protecting data packets; and configure AS security protection for data packets based at least in part on the AS security indication and the indicated AS protocol layer.

Some examples of the method, apparatuses, or non-transitory computer-readable medium may include operations, features, means, or instructions for: transmitting to the network node, as part of establishing the connection, an indication of an AS security capability of the UE. In some examples of the method, apparatuses, or non-transitory computer-readable medium, the indication of the AS security capability may include an indication of at least one of: a packet data convergence protocol (PDCP) layer security capability, or a radio link control (RLC) layer security capability, or a medium access control (MAC) layer security capability, or a combination thereof.

Some examples of the method, apparatuses, or non-transitory computer-readable medium may include operations, features, means, or instructions for: deriving, as part of establishing the connection, a UE-specific AS key based at least in part on a key associated with a network access device controller associated with a serving network access device for the UE; and configuring the AS security protection for data packets based at least in part on the UE-specific AS key.

Some examples of the method, apparatuses, or non-transitory computer-readable medium may include operations, features, means, or instructions for: transmitting to the network node, as part of establishing the connection, a count of handovers of the UE within the network node; and increasing the count of handovers after establishing the connection.

In some examples of the method, apparatuses, or non-transitory computer-readable medium, the UE-specific AS key may be further based at least in part on an identifier of the serving network access device for the UE and the count of handovers.

Some examples of the method, apparatuses, or non-transitory computer-readable medium may include operations, features, means, or instructions for: receiving from the network node, as part of establishing the connection, a UE-specific AS key.

Some examples of the method, apparatuses, or non-transitory computer-readable medium may include operations, features, means, or instructions for: exchanging nonces with a serving network access device for the UE; deriving an AS security protection key based at least in part on the UE-specific AS key and the exchanged nonces; and configuring the AS security protection for data packets based at least in part on the AS security protection key.

In some examples of the method, apparatuses, or non-transitory computer-readable medium, the UE-specific AS key may be based at least in part on a key associated with a serving network access device for the UE, and an identifier of the UE.

In some examples of the method, apparatuses, or non-transitory computer-readable medium, the AS security indication may indicate at least one of a PDCP layer security, or a RLC layer security, or a MAC layer security, and the method, apparatuses, or non-transitory computer-readable medium may include operations, features, means, or instructions for: synchronizing an uplink data packet counter and a downlink data packet counter with a serving network access device, the uplink data packet counter and the downlink data packet counter maintained at the PDCP layer, or the RLC layer, or the MAC layer in accordance with the AS security indication.

In some examples of the method, apparatuses, or non-transitory computer-readable medium, configuring AS security protection for data packets may include operations, features, means, or instructions for: exchanging nonces with the network node.

In some examples of the method, apparatuses, or non-transitory computer-readable medium, establishing the connection with the network node may include operations, features, means, or instructions for performing a random access procedure, and may further include operations, features, means, or instructions for transmitting to the network node, while performing the random access procedure, a connection request.

In some examples of the method, apparatuses, or non-transitory computer-readable medium, the connection with the network node may be established during a handover of the UE from a first network access device to a second network access device.

In some examples of the method, apparatuses, or non-transitory computer-readable medium, the AS security protection for data packets may include: ciphering for data packets, or integrity protection for data packets, or a combination thereof.

In some examples of the method, apparatuses, or non-transitory computer-readable medium, the AS security indication may indicate a type of AS security protection, the type of AS security protection comprising: ciphering for data packets, or integrity protection for data packets, or a combination thereof.

A method for configuring AS security at a network access device is described. The method may include: establishing a connection with a UE; receiving from a network access device controller, as part of establishing the connection, an AS security indication indicating an AS protocol layer for protecting data packets; and configuring AS security protection for data packets transmitted to or received from the UE based at least in part on the AS security indication and the indicated AS protocol layer.

An apparatus for configuring AS security at a network access device is described. The apparatus may include a processor, memory in electronic communication with the processor, and instructions stored in the memory. The instructions may be executable by the processor to: establish a connection with a UE; receive from a network access device controller, as part of establishing the connection, an AS security indication indicating an AS protocol layer for protecting data packets; and configure AS security protection for data packets transmitted to or received from the UE based at least in part on the AS security indication and the indicated AS protocol layer.

Another apparatus for configuring AS security at a network access device is described. The apparatus may include: means for establishing a connection with a UE; means for receiving from a network access device controller, as part of establishing the connection, an AS security indication indicating an AS protocol layer for protecting data packets; and means for configuring AS security protection for data packets transmitted to or received from the UE based at least in part on the AS security indication and the indicated AS protocol layer.

A non-transitory computer-readable medium for configuring AS security at a network access device is described. The non-transitory computer-readable medium may include instructions executable by a processor to: establish a connection with a UE; receive from a network access device controller, as part of establishing the connection, an AS security indication indicating an AS protocol layer for protecting data packets; and configure AS security protection for data packets transmitted to or received from the UE based at least in part on the AS security indication and the indicated AS protocol layer.

Some examples of the method, apparatuses, or non-transitory computer-readable medium may include operations, features, means, or instructions for: receiving from the network access device controller, as part of establishing the connection with the UE, a UE-specific AS key for the UE.

Some examples of the method, apparatuses, or non-transitory computer-readable medium may include operations, features, means, or instructions for: receiving, from the network access device controller, a network access device-specific AS key.

Some examples of the method, apparatuses, or non-transitory computer-readable medium may include operations, features, means, or instructions for: exchanging nonces with the UE; deriving an AS security protection key based at least in part on the network access device-specific AS key and the exchanged nonces; and configuring the AS security protection for data packets transmitted to or received from the UE based at least in part on the AS security protection key.

In some examples of the method, apparatuses, or non-transitory computer-readable medium, the AS security indication may indicate at least one of a PDCP layer security, or an RLC layer security, or a MAC layer security, and the method, apparatuses, or non-transitory computer-readable medium may include operations, features, means, or instructions for: synchronizing an uplink data packet counter and a downlink data packet counter with the UE, the uplink data packet counter and the downlink data packet counter maintained at the PDCP layer, or the RLC layer, or the MAC layer in accordance with the AS security indication.

Some examples of the method, apparatuses, or non-transitory computer-readable medium may include operations, features, means, or instructions for: receiving from the UE, as part of establishing the connection with the UE, an indication of an AS security capability of the UE. In some examples of the method, apparatuses, or non-transitory computer-readable medium, the indication of the AS security capability may include an indication of at least one of: a PDCP layer security capability, or an RLC layer security capability, or a MAC layer security capability, or a combination thereof.

Some examples of the method, apparatuses, or non-transitory computer-readable medium may include operations, features, means, or instructions for: establishing the connection with the UE in response to receiving a connection request from the UE; forwarding at least a part of the connection request to the network access device controller; receiving, from the network access device controller, a connection response including the AS security indication; and forwarding at least a part of the connection response to the UE.

Some examples of the method, apparatuses, or non-transitory computer-readable medium may include operations, features, means, or instructions for: receiving the connection request while the UE is performing a random access procedure with the network access device.

In some examples of the method, apparatuses, or non-transitory computer-readable medium, the AS security indication may be received from the network access device controller during a handover of the UE to the network access device.

In some examples of the method, apparatuses, or non-transitory computer-readable medium, the AS security protection for data packets may include: ciphering for data packets, or integrity protection for data packets, or a combination thereof.

In some examples of the method, apparatuses, or non-transitory computer-readable medium, the AS security indication may further indicate a type of AS security protection, the type of AS security protection comprising: ciphering for data packets, or integrity protection for data packets, or a combination thereof.

A method for configuring AS security at a network access device controller is described. The method may include determining an AS security mode for a UE, the AS security mode indicating an AS protocol layer for protecting data packets transmitted to or received from the UE; deriving an AS key for the UE based at least in part on the AS security mode; and transmitting, to the UE, an AS security indication identifying the AS security mode.

An apparatus for configuring AS security at a network access device controller is described. The apparatus may include a processor, memory in electronic communication with the processor, and instructions stored in the memory. The instructions may be executable by the processor to: determine an AS security mode for a UE, the AS security mode indicating an AS protocol layer for protecting data packets transmitted to or received from the UE; derive an AS key for the UE based at least in part on the AS security mode; and transmit, to the UE, an AS security indication identifying the AS security mode.

Another apparatus for configuring AS security at a network access device controller is described. The apparatus may include means for determining an AS security mode for a UE, the AS security mode indicating an AS protocol layer for protecting data packets transmitted to or received from the UE; means for deriving an AS key for the UE based at least in part on the AS security mode; and means for transmitting, to the UE, an AS security indication identifying the AS security mode.

A non-transitory computer-readable medium for configuring AS security at a network access device controller is described. The non-transitory computer-readable medium may include instructions executable by a processor to: determine an AS security mode for a UE, the AS security mode indicating an AS protocol layer for protecting data packets transmitted to or received from the UE; derive an AS key for the UE based at least in part on the AS security mode; and transmit, to the UE, an AS security indication identifying the AS security mode.

In some examples of the method, apparatuses, or non-transitory computer-readable medium, the AS security mode may include at least one of: a PDCP layer security mode, or an RLC layer security mode, or a MAC layer security mode, or a combination thereof.

Some examples of the method, apparatuses, or non-transitory computer-readable medium may include operations, features, means, or instructions for: identifying an AS security capability of the UE. In some examples of the method, apparatuses, or non-transitory computer-readable medium, the AS security capability may include at least one of: a PDCP layer security capability, or an RLC layer security capability, or a MAC layer security capability, or a combination thereof.

In some examples of the method, apparatuses, or non-transitory computer-readable medium, deriving the AS key for the UE may include operations, features, means, or instructions for deriving a UE-specific AS key for the UE, and the method, apparatuses, or non-transitory computer-readable medium may further include operations, features, means, or instructions for: transmitting the UE-specific AS key to a serving network access device for the UE.

In some examples of the method, apparatuses, or non-transitory computer-readable medium, deriving the AS key for the UE may include operations, features, means, or instructions for deriving a UE-specific AS key for the UE, and the method, apparatuses, or non-transitory computer-readable medium may further include operations, features, means, or instructions for: transmitting the UE-specific AS key to the UE.

Some examples of the method, apparatuses, or non-transitory computer-readable medium may include operations, features, means, or instructions for: deriving a network access device-specific AS key based at least in part on the AS security mode, wherein the UE-specific AS key for the UE is derived based at least in part on the network access device-specific AS key; and transmitting the network access device-specific AS key to a first serving network access device for the UE.

Some examples of the method, apparatuses, or non-transitory computer-readable medium may include operations, features, means, or instructions for: initiating a handover of the UE from the first serving network access device for the UE to a second serving network access device for the UE; and transmitting the network access device-specific AS key to the second serving network access device for the UE.

Some examples of the method, apparatuses, or non-transitory computer-readable medium may include operations, features, means, or instructions for: deriving the UE-specific AS key for the UE and the network access device-specific AS key based at least in part on a pair of related indices; and signaling a key rollover to the first serving network access device and the UE based at least in part on an update to the pair of related indices.

Some examples of the method, apparatuses, or non-transitory computer-readable medium may include operations, features, means, or instructions for: receiving a connection request from the UE through a network access device; and determining the AS security mode based at least in part on the connection request.

In some examples of the method, apparatuses, or non-transitory computer-readable medium, the AS security mode for the UE may be determined based at least in part on: a load on at least one computational resource, or a usage level of at least one communication link, or an identification of an attack, or a throughput of at least one communication link, or a combination thereof.

In some examples of the method, apparatuses, or non-transitory computer-readable medium, the AS security indication may further indicate a type of AS security protection, the type of AS security protection comprising: ciphering for data packets, or integrity protection for data packets, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
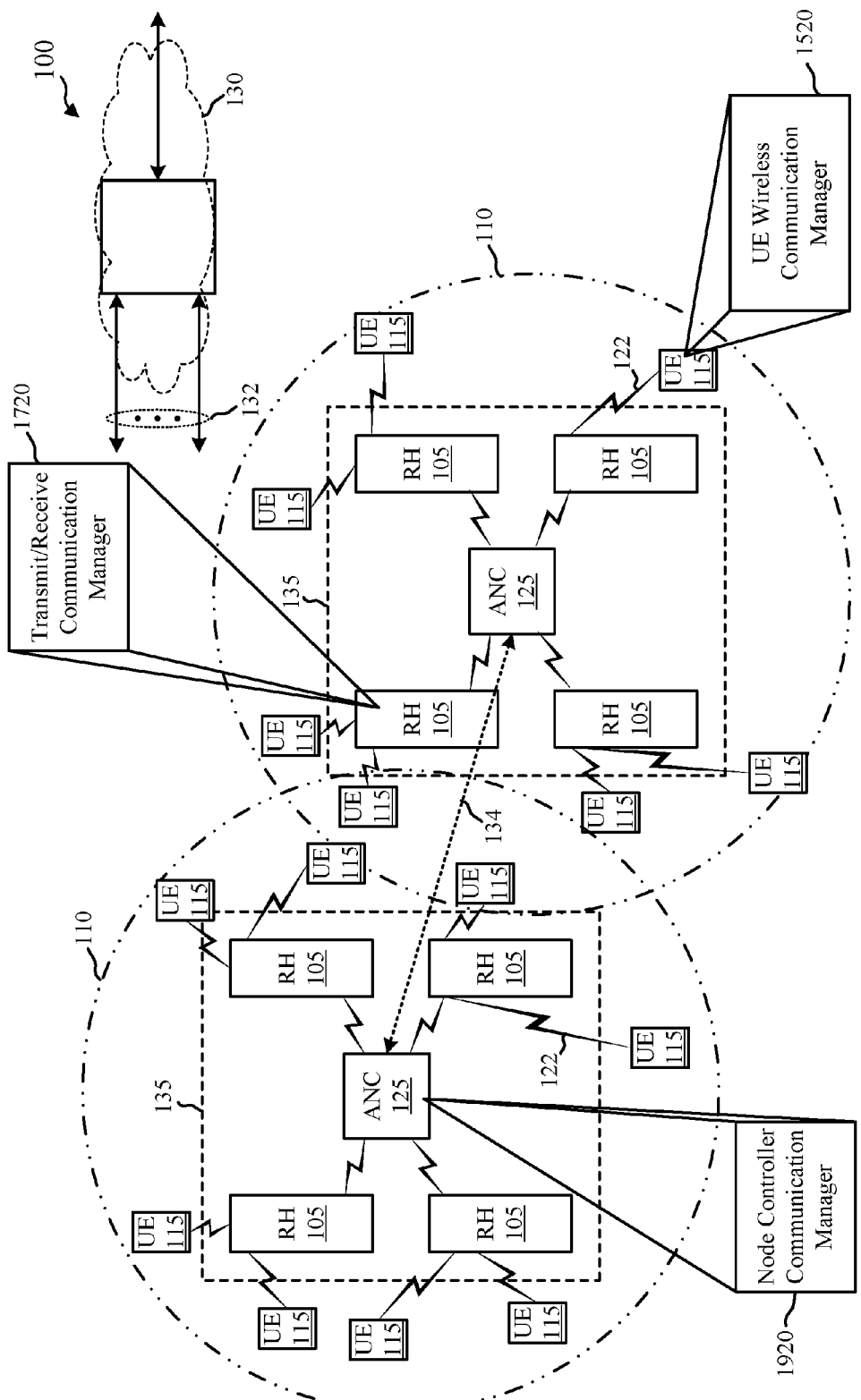
FIG. 1 illustrates an example of a wireless communication system that supports configurable AS security, in accordance with various aspects of the disclosure.

Techniques are described in which a network node and/or a user equipment (UE) is provided with configurable access stratum (AS) security. In a next generation or 5G network, the functionality associated with a protocol layer stack may be split between a network access device controller (e.g., a centralized network access device, a central unit, a central node, an access node controller (ANC), etc.) and plurality of network access devices (e.g., a distributed network access device, a distributed unit, an edge node, an edge unit, a radio head (RH), a smart radio head (SRH), a transmission and reception point (TRP), etc.) that collectively define a network node. In some examples, an upper protocol layer of the protocol stack may be processed by the network access device controller, and a lower protocol layer of the protocol stack may be processed by associated network access devices. Intermediate layers may be processed by the network access device controller and/or the network access devices, depending on the configuration of the network node. AS security protection is typically provided at an upper protocol layer (e.g., a packet data convergence protocol (PDCP) layer), and may be handled by the network access device controller. However, the handling of AS security protection can place a significant processing on the network access device controller.

The techniques described in the present disclosure enable a network access device controller to select the layer at which AS security protection is processed. In some examples, the layer for processing AS security protection may be selected for the purpose of enabling an offload of AS security protection processing from one device to another device (or to a set of devices). For example, when a lower protocol layer is implemented at a plurality of network access devices associated with a network access device controller (and regardless of whether the lower protocol layer is implemented by the network access device controller or not), the network access device controller may select the lower protocol layer for processing AS security protection, and may indicate to the network access devices that AS security protection is to be processed at the lower protocol layer by the network access devices. Pushing AS security protection to the network access devices associated with a network access device controller may reduce the computational overhead or processing load at the network access device controller, thereby mitigating the likelihood of a performance bottleneck arising at the network access device controller.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

FIG. 1 illustrates an example of a wireless communication system 100 that supports configurable AS security, in accordance with various aspects of the disclosure. The wireless communication system 100 may include network access devices (e.g., distributed network access devices, distributed units, RHs, SRHs, TRPs, edge nodes, edge units, etc.) 105, UEs 115, network access device controllers (e.g., centralized network access devices, central nodes, central units, access node controllers (ANCs), etc.) 125, and a core network 130. The core network 130 may provide user authentication, access authorization, tracking, Internet Protocol (IP) connectivity, and other access, routing, or mobility functions. The network access device controllers 125 may interface with the core network 130 through backhaul links 132 (e.g., S1, S2, etc.) and may perform radio configuration and scheduling for communication with the UEs 115. In various examples, the network access device controllers 125 may communicate, either directly or indirectly (e.g., through core network 130), with each other over backhaul links 134 (e.g., X1, X2, etc.), which may be wired or wireless communication links. Each network access device controller 125 may also communicate with a number of UEs 115 through a number of network access devices (e.g., RHs) 105. In an alternative configuration of the wireless communication system 100, the functionality of a network access device controller 125 may be provided by a network access device 105 or distributed across the network access devices 105 of a network node (e.g., an access node, a New Radio Base Station (NR BS), etc.) 135. In another alternative configuration of the wireless communication system 100, the network nodes 135 may be replaced by eNBs, the network access devices 105 may be replaced with base stations, and the network access device controllers 125 may be replaced by base station controllers (or links to the core network 130).

The network access device controllers 125 may communicate with the UEs 115 via one or more network access devices 105, with each network access device 105 having one or more antennas for wirelessly communicating with a number of UEs 115. Each of the network nodes 135 may provide communication coverage for a respective geographic coverage area 110, and may provide one or more remote transceivers associated with one or more network access devices 105. A network access device 105 may perform many of the functions of a LTE/LTE-A base station. In some examples, a network access device controller 125 may be implemented in distributed form, with a portion of the network access device controller 125 being provided in each network access device 105. The geographic coverage area 110 for a network node 135 may be divided into sectors making up only a portion of the coverage area (not shown), and in some examples a geographic coverage area 110 for a network node 135 may be formed from a set of geographic coverage areas for a set of network access devices 105 associated with the network node 135 (not shown). In some examples, the network access devices 105 may be replaced with alternative network access devices, such as base transceiver stations, radio base stations, access points, radio transceivers, NodeBs, eNodeBs (eNBs), Home NodeBs, Home eNodeBs, etc. The wireless communication system 100 may include network access devices 105 (or base stations or other network access devices) of different types (e.g., macro cell and/or small cell network access devices). The geographic coverage areas of the network access devices 105 and/or network nodes 135 may overlap. In some examples, different network access devices 105 may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of network access devices 105 or network nodes 135 provide coverage for various geographical regions. For example, each network access device 105 or network node 135 may provide communication coverage for a macro cell, a small cell, and/or other types of cell. The term "cell" may be used to describe a base station, an RH, a carrier or component carrier associated with a base station or an RH, or a coverage area (e.g., sector, etc.) of a carrier or base station, depending on context.

A macro cell may cover a relatively large geographic area (e.g., several kilometers in radius) and may allow access by UEs 115 with service subscriptions with a network provider. A small cell may include a lower-powered RH or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An network access device for a macro cell may be referred to as a macro network access device. A network access device for a small cell may be referred to as a small cell network access device, a pico network access device, a femto network access device, or a home network access device. A network access device may support one or multiple (e.g., two, three, four, and the like) cells (e.g., component carriers).

The wireless communication system 100 may support synchronous or asynchronous operation. For synchronous operation, the network nodes 135 or network access devices 105 may have similar frame timing, and transmissions from different network access devices 105 may be approximately aligned in time. For asynchronous operation, the network nodes 135 or network access devices 105 may have different frame timings, and transmissions from different network access devices 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network access device 105, network access device controller 125, or the core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, an automobile, or other electronic device having a wireless communication interface. A UE may be able to communicate with various types of network nodes 135 or network access devices 105, including small cell nodes, relay nodes, and the like. A UE may also be able to communicate directly with other UEs (e.g., using a peer-to-peer (P2P) protocol).

The communication links 122 shown in wireless communication system 100 may include uplink (UL) channels from a UE 115 to a network access device 105, and/or downlink (DL) channels, from a network access device 105 to a UE 115. The downlink channels may also be called forward link channels, while the uplink channels may also be called reverse link channels.

One or more of the UEs 115 may include a UE wireless communication manager 1520. In some examples, the UE wireless communication manager 1520 may be used to: establish a connection with a network node 135; receive from the network node 135, as part of establishing the connection, an AS security indication indicating an AS protocol layer for protecting data packets; and configure AS security protection for data packets based at least in part on the AS security indication and the indicated AS protocol layer. In some examples, the UE wireless communication manager 1520 may be an example of aspects of the UE wireless communication managers 1520 described with reference to FIG. 15, 16, or 21.

One or more of the network access devices 105 may include a transmit/receive communication manager 1720. In some examples, the transmit/receive communication manager 1720 may be used to: establish a connection with a UE 115; receive from a network access device controller 125, as part of establishing the connection, an AS security indication indicating an AS protocol layer for protecting data packets; and configuring AS security protection for data packets transmitted to or received from the UE 115 based at least in part on the AS security indication and the indicated AS protocol layer. In some examples, the transmit/receive communication manager 1720 may be an example of aspects of the transmit/receive communication managers 1720 described with reference to FIG. 17, 18, or 22.

One or more of the network access device controllers 125 may include a node controller communication manager 1920. In some examples, the node controller communication manager 1920 may be used to: determine an AS security mode for a UE 115, where the AS security mode indicates an AS protocol layer for protecting data packets transmitted to or received from the UE 115; derive an AS key for the UE 115 based at least in part on the AS security mode; and transmit, to the UE 115, an AS security indication identifying the AS security mode. In some examples, the node controller communication manager 1920 may be an example of aspects of the node controller communication managers 1920 described with reference to FIG. 19, 20, or 23.

Each communication link 122 may include one or more carriers, where each carrier may be a signal made up of multiple sub-carriers or tones (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 122 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the network access devices 105 and/or UEs 115 may include multiple antennas for employing antenna diversity schemes to improve communication quality and reliability between network access devices 105 and UEs 115. Additionally or alternatively, network access devices 105 and/or UEs 115 may employ multiple-input multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
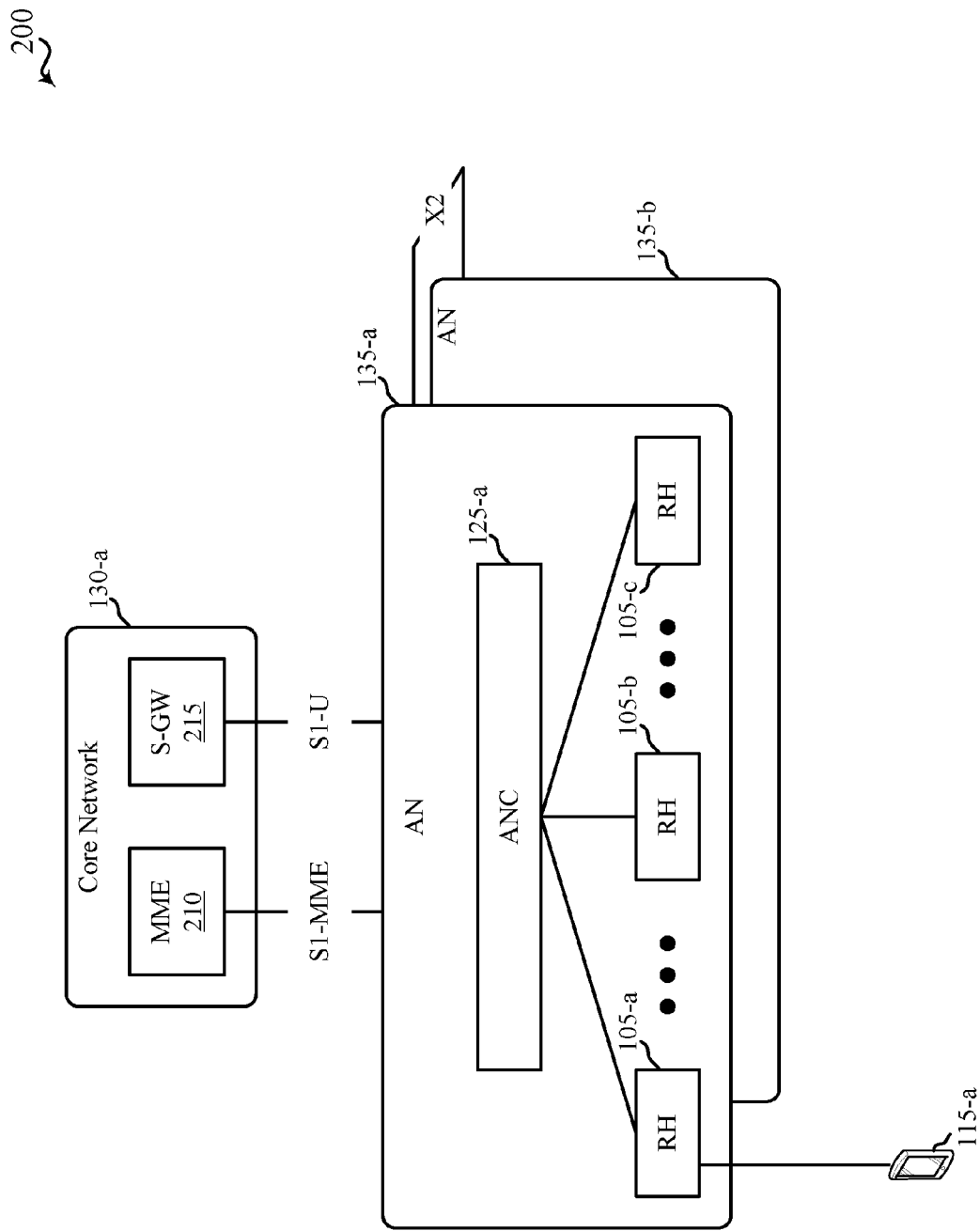
FIG. 2 illustrates an example of a wireless communication system, in accordance with various aspects of the present disclosure.

FIG. 2 illustrates an example of a wireless communication system 200, in accordance with various aspects of the present disclosure. The wireless communication system 200 may include a number of network nodes (e.g., access networks (ANs)) 135, including, for example, a first network node 135-a and a second network node 135-b. Each of the network nodes 135 may interface with a core network 130-a, which may be an example of aspects of the core network 130 described with reference to FIG. 1. In some examples, the core network 130-a may include a mobility management entity (MME) 210 or a serving gateway (S-GW) 215 (e.g., a MME or S-GW for a next generation or 5G network).

Each of the network nodes 135 may include a network access device controller (e.g., ANC) 125 and a number of network access devices (e.g., RHs) 105. For example, the first network node 135-a may include a network access device controller 125-a, a first network access device 105-a, a second network access device 105-b, and a third network access device 105-c. By way of example, a UE 115-a is shown to communicate with the first network access device 105-a. Other UEs (not shown) may communicate with the first network access device 105-a or with other network access devices 105. The UE 115-a may be handed over from one network access device 105 (e.g., a first serving network access device) to another network access device 105 (e.g., a second serving network access device) as it moves within the wireless communication system 200, and may be handed over from one network access device 105 to another network access device 105 intra-node (e.g., within the first network node 135-a) or inter-node (e.g., between the first network node 135-a and the second network node 135-b). The network access device controller 125-a, first network access device 105-a, second network access device 105-b, third network access device 105-c, and UE 115-a may be examples of the network access device controllers 125, network access devices 105, and UEs 115 described with reference to FIG. 1. Communications between network nodes 135 (e.g., between network access device controllers 125 of the network nodes 135) may in some examples be conducted over a X2 interface.

Each network access device controller 125 within the wireless communication system 200 (including the network access device controller 125-a) may terminate a connection to the core network 130-a for all of the network access devices 105 within a network node 135 (e.g., via a S1-MME interface and a S1-U (user) interface). For example, the network access device controller 125-a may terminate a connection to the core network 130-a for the first network access device 105-a, the second network access device 105-b, and the third network access device 105-c. The network access device controller 125-a may also coordinate actions between or including multiple network access devices 105. For example, the network access device controller 125-a may coordinate intra-access network handovers of a UE from one network access device 105 to another network access device 105. The network access device controller 125-a may also coordinate RRC layer and user (u)-plane PDCP layer communications for the first network node 135-a.

Each network access device 105 within the wireless communication system 200 may serve traffic between a set of UEs for which the network access device operates as a serving network access device and a network access device controller with which the network access device is associated. For example, the first network access device 105-a may serve traffic between a set of UEs, including the UE 115-a, and the network access device controller 125-a. In some examples, a network access device 105 may function as an SRH and monitor UEs for uplink signaling or mobility. An SRH may also perform PHY layer processing (reception, transmission, and measurement of signals), and in some examples may perform MAC layer or RLC layer processing.

Figure 3:
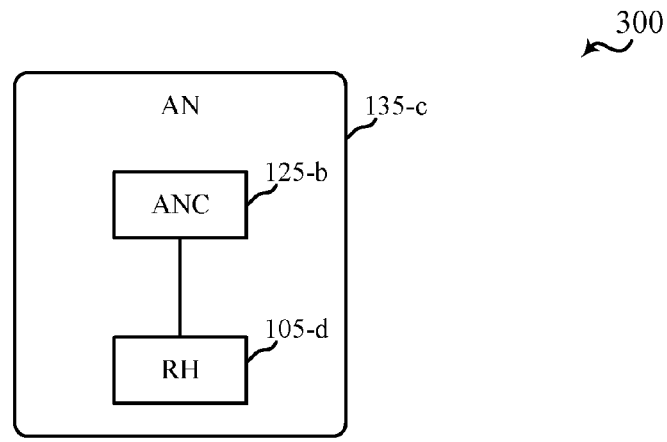
FIGS. 3-9 show examples of network nodes, in accordance with various aspects of the present disclosure.
Figure 4:
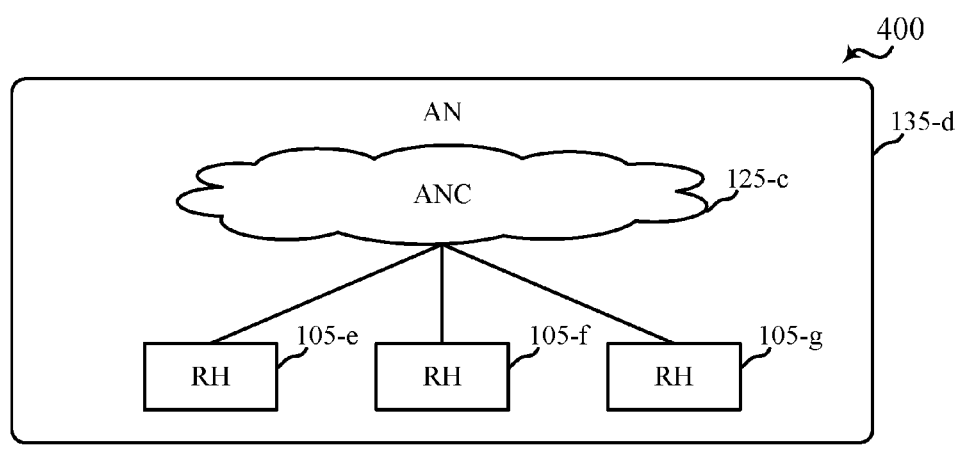
Figure 5:
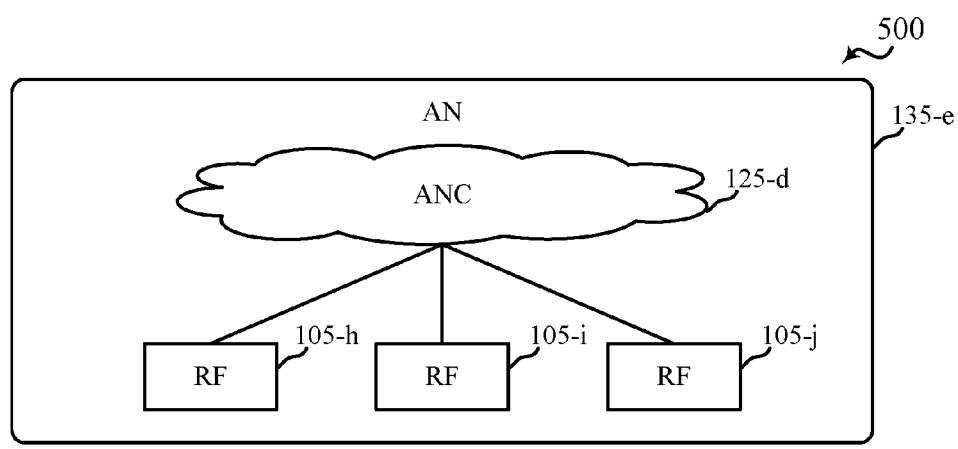

FIGS. 3-5 show various alternative configurations of network nodes 135, which may be examples of the network nodes 135 described with reference to FIGS. 1 and 2.

FIG. 3 shows an example 300 of a network node 135-c, in accordance with various aspects of the present disclosure. The network node 135-c may include a collocated network access device (e.g., RH) 105-d and network access device controller (e.g., ANC) 125-b. In some examples, the network access device 105-d may process a lower protocol layer (or layers) of a protocol stack, and the network access device controller 125-b may process an upper protocol layer (or layers) of the protocol stack.

FIG. 4 shows an example 400 of a network node 135-d, in accordance with various aspects of the present disclosure. The network node 135-d may include a plurality of network access devices (e.g., RHs) 105 (e.g., a first network access device 105-e, a second network access device 105-f, and a third network access device 105-g) that are non-collocated with a network access device controller (e.g., ANC) 125-c for the network node 135-d. In some examples, the network access devices 105 may process a lower protocol layer (or layers) of a protocol stack, and the network access device controller 125-c may process an upper protocol layer (or layers) of the protocol stack. The network access device controller 125-c may support intra-node mobility of UEs from one network access device to another network access device within the network node 135-d.

FIG. 5 shows an example 500 of a network node 135-e, in accordance with various aspects of the present disclosure. The network node 135-e may include a plurality of network access devices (e.g., RFs) 105 (e.g., a first network access device 105-h, a second network access device 105-i, and a third network access device 105-j) that are non-collocated with a network access device controller 125-d for the network node 135-e. In some examples, the network access devices 105 may distribute radio frequency (RF) functionality for the network node 135-e, and the network access device controller 125-d may provide common baseband processing and c/u-plane protocol stack processing for the network access devices 105.

FIGS. 6-9 illustrate various examples of how a protocol stack of a network node 135 (e.g., network nodes 135 described with reference to FIGS. 1-5) may be integrated or split between the various components or devices of the network node 135.

Figures 6, 7:
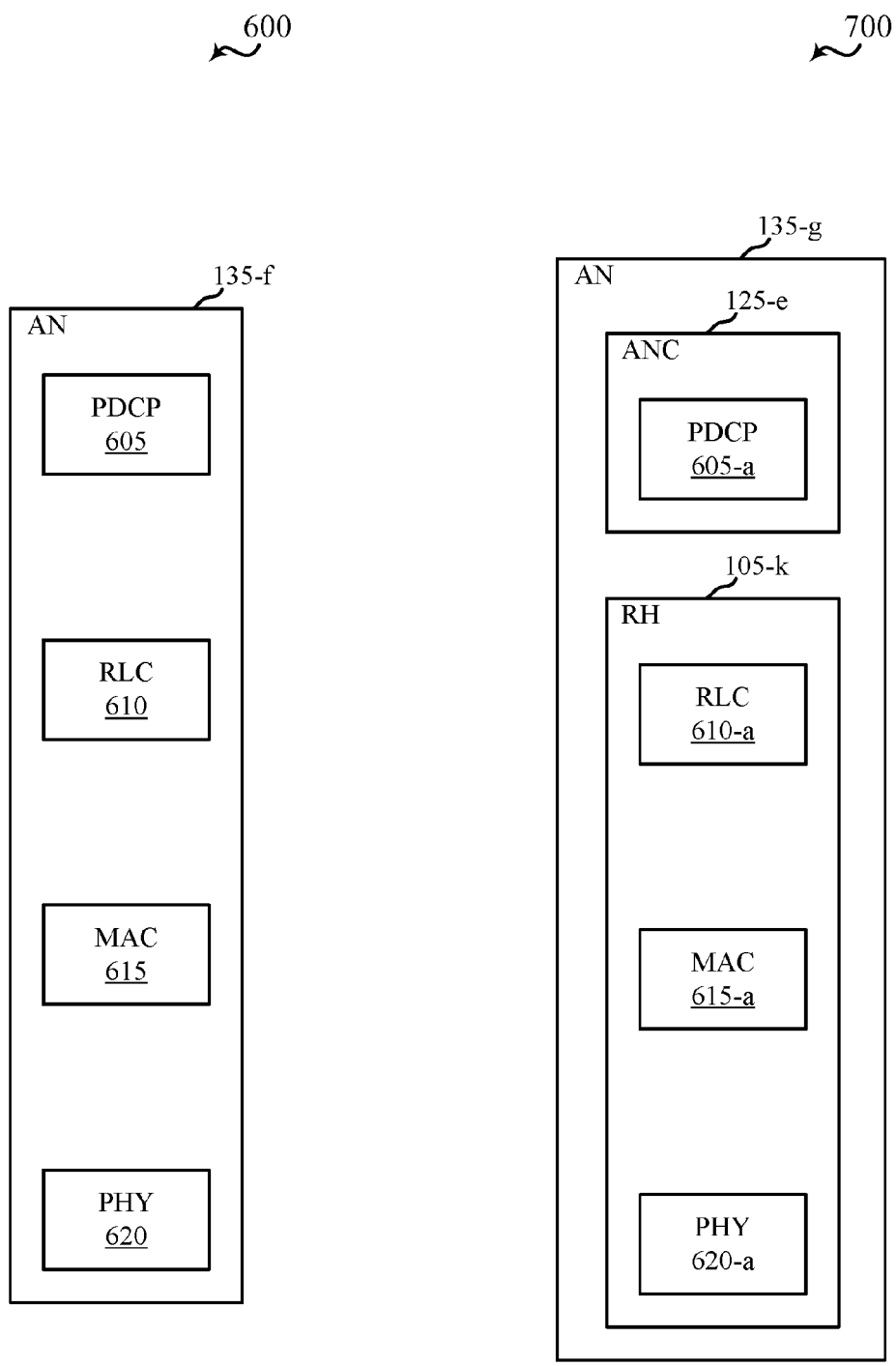

FIG. 6 shows an example 600 of a network node 135-f, in accordance with various aspects of the present disclosure. The network node 135-f may include a collocated network access device 105 and network access device controller 125, or the functions of the network access device 105 and the network access device controller 125 may be implemented by a same set of components. The network node 135-*f* may process all of the layers of a protocol stack, including a PDCP layer 605, an RLC layer 610, a MAC layer 615, and a PHY layer 620.

FIG. 7 shows an example 700 of a network node 135-*g*, in accordance with various aspects of the present disclosure. The network node 135-*g* may include a non-collocated network access device 105-*k* and network access device controller 125-*e*. As shown, the network access device 105-*k* may process lower protocol layers of a protocol stack, including an RLC layer 610-*a*, a MAC layer 615-*a*, and a PHY layer 620-*a*, and the network access device controller 125-*e* may process an upper protocol layer (e.g., PDCP layer 605-*a*) of the protocol stack.

Figures 8, 9:
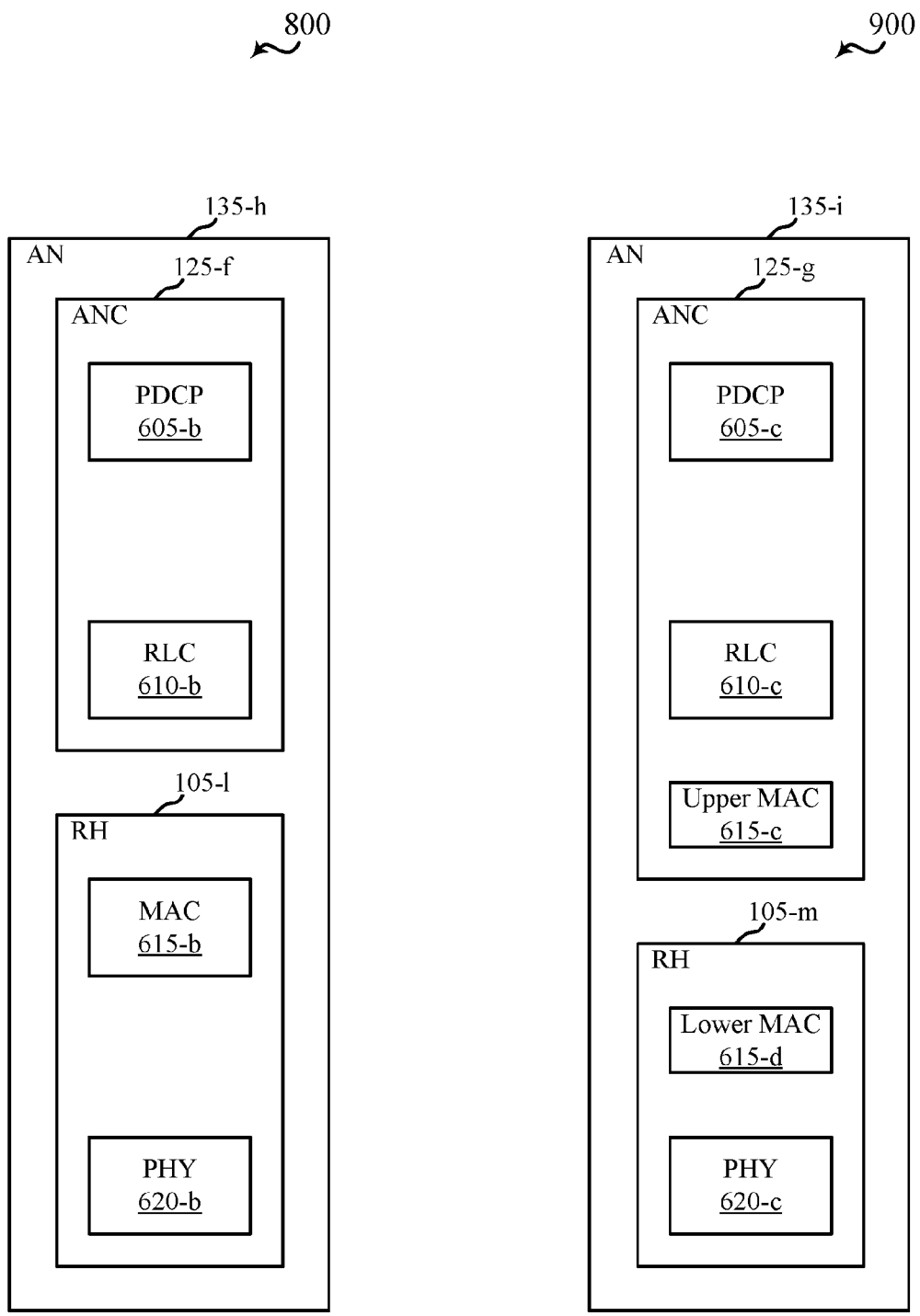

FIG. 8 shows an example 800 of a network node 135-*h*, in accordance with various aspects of the present disclosure. The network node 135-*h* may include a non-collocated network access device 105-*l* and network access device controller 125-*f*. As shown, the network access device 105-*l* may process lower protocol layers of a protocol stack, including a MAC layer 615-*b* and a PHY layer 620-*b*, and the network access device controller 125-*f* may process upper protocol layers of the protocol stack, including a PDCP layer 605-*b* and an RLC layer 610-*b*.

FIG. 9 shows an example block diagram 900 of a network node 135-*i*, in accordance with various aspects of the present disclosure. The network node 135-*i* may include a non-collocated network access device 105-*m* and network access device controller 125-*g*. As shown, the network access device 105-*m* may process lower protocol layers of a protocol stack, including a lower MAC layer 615-*d* and a PHY layer 620-*c*, and the network access device controller 125-*g* may process upper protocol layers of the protocol stack, including a PDCP layer 605-*c*, an RLC layer 610-*c*, and an upper MAC layer 615-*c*.

The decision to integrate or split the functionality of a protocol stack (e.g., as shown in the examples of FIGS. 6-9) may be based on factors such as fronthaul latency requirements of UEs and coordination of functionality on the network side. Fronthaul latency tends to decrease as more protocol stack functionality is moved toward a separate network access device controller, but coordination opportunities tend to increase as more protocol stack functionality is moved toward the network access device controller.

Network nodes 135 (e.g., access nodes) employing next-generation or 5G communications protocols, such as those configured as described in FIGS. 1-9, or in other ways, may be designed to cover wider geographic areas than LTE/LTE eNBs. In these and other types of network nodes 135, and under some operating conditions, a network access device controller 125 (e.g., an ANC) associated with such a network node 135 may become a performance bottleneck for the network node 135. The performance bottleneck may arise, for example, because a network access device controller 125 may process communications from/to UEs served by multiple network access devices 105 (e.g., multiple RHs), or because of the high throughput of such a network node 135. Part of the computational overhead associated with the high throughput may be due to AS security protection for data packets (e.g., u-plane messages, and to a lesser extent in some examples, c-plane messages). The performance bottleneck may occur naturally, or may be triggered by an attack in which the network node 135 is flooded with bogus uplink and/or downlink traffic. When AS security protection is implemented at an upper protocol layer (e.g., a PDCP layer 605), and the upper protocol layer is processed at a network access device controller 125, high traffic and/or bogus traffic may increase the overhead (e.g., resources consumed) at the network access device controller 125 and adversely affect the performance of the network access device controller 125.

To mitigate the likelihood of a performance bottleneck arising at a network access device controller 125, the techniques described in the present disclosure enable AS security protection for data packets to be selectively pushed down to (or processed at) a lower protocol layer (e.g., an RLC layer 610, a MAC layer 615, a portion of a divided layer such as a lower MAC layer 615, etc.). When the lower protocol layer is processed at a network access device 105, much of the overhead associated with providing AS security protection can be offloaded from the network access device controller 125 to one or more network access devices 105 associated with the network access device controller 125.

Figure 10:
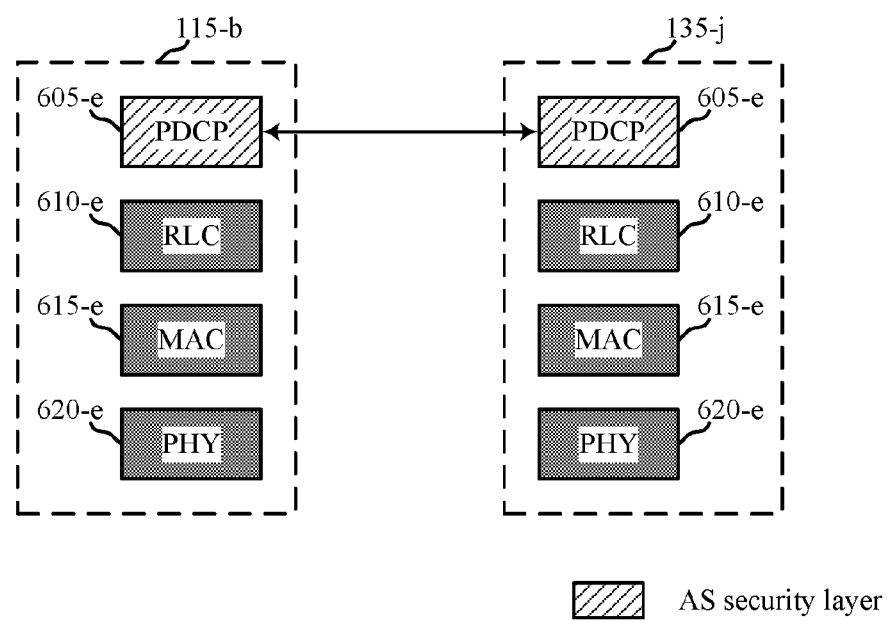
FIGS. 10, 11, 12A and 12B show examples of providing AS security protection for UEs, in accordance with various aspects of the present disclosure.

FIG. 10 shows an example 1000 of providing AS security protection for a UE 115-*b*, in accordance with various aspects of the present disclosure. As shown, the UE 115-*b* may access a network via (or associate with) a network node 135-*j*. The UE 115-*b* may be an example of aspects of the UEs 115 described with reference to FIG. 1 or 2, and the network node 135-*j* may be an example of aspects of the network nodes 135 described with reference to FIGS. 1-9.

Each of the UE 115-*b* and the network node 135-*j* may implement a protocol stack including a PDCP layer 605-*e*, an RLC layer 610-*e*, a MAC layer 615-*e*, and a PHY layer 620-*e*. AS security protection for data packets transmitted to or received from the UE 115-*b* may be processed at the PDCP layer 605-*e* (e.g., an upper protocol layer). Because there is no separation of duties between network access devices and a network access device controller at the network node 135-*j*, a performance bottleneck may arise at the network node 135-*j*, regardless of the protocol layer at which AS security protection is provided.

Figure 11:
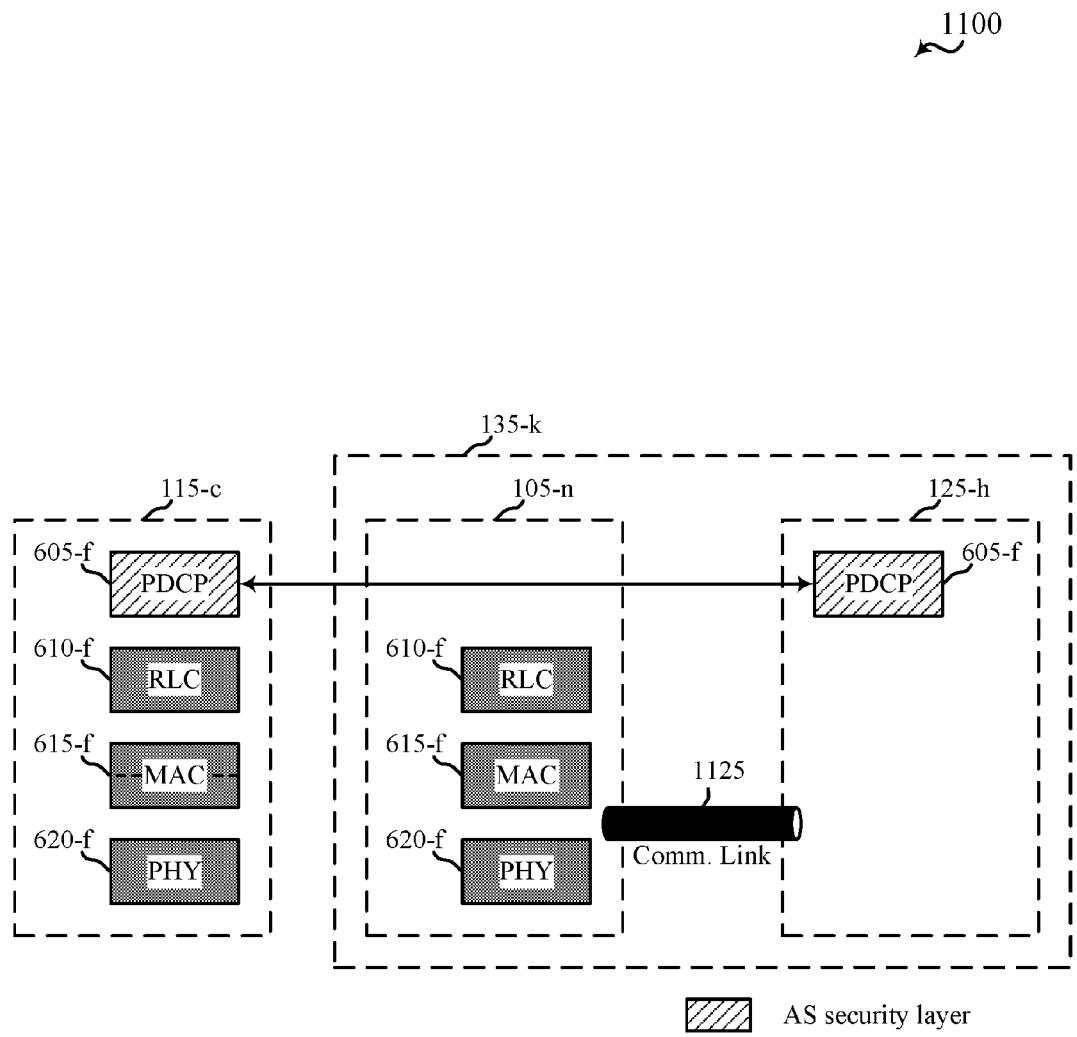

FIG. 11 shows an example 1100 of providing AS security protection for a UE 115-*c*, in accordance with various aspects of the present disclosure. As shown, the UE 115-*c* may access a network via (or associate with) a network node 135-*k*. The UE 115-*c* may be an example of aspects of the UEs 115 described with reference to FIG. 1, 2, or 10, and the network node 135-*k* may be an example of aspects of the network nodes 135 described with reference to FIGS. 1-9. The network node 135-*k* may include a network access device (e.g., RH) 105-*n* and a network access device controller (e.g., ANC) 125-*h*. A communication link 1125 may link the network access device 105-*n* to the network access device controller 125-*h*. The network node 135-*k* may also include other network access devices (not shown), which may communicate with the network access device controller 125-*h* over other communication links.

Each of the UE 115-*c* and the network node 135-*k* may implement a protocol stack including a PDCP layer 605-*f*, an RLC layer 610-*f*, a MAC layer 615-*f*, and a PHY layer 620-*f*. On the network side, implementation of the protocol stack may be split between the network access device 105-*n* and the network access device controller 125-*h*. Alternatively, the full protocol stack may be implemented by the network access device 105-*n* and by the network access device controller 125-*h*, but processing of the protocol stack may be split between the network access device 105-*n* and the network access device controller 125-*h*. By way of example, FIG. 11 shows at least the PDCP layer 605-*f* being processed by the network access device controller 125-*h*, and the RLC layer 610-*f*, the MAC layer 615-*f*, and the PHY layer 620-*f* being processed by the network access device 105-*n*. In alternative examples, the RLC layer 610-f or part or all of the MAC layer 615-f could be processed by the network access device controller 125-h.

In FIG. 11, the network access device controller 125-h may determine that AS security protection for data packets transmitted to or received from the UE 115-c should be processed at the PDCP layer 605-f (e.g., an upper protocol layer). Because AS security protection is processed at the PDCP layer 605-f, a performance bottleneck may arise at the network access device controller 125-h.

Figure 12A:
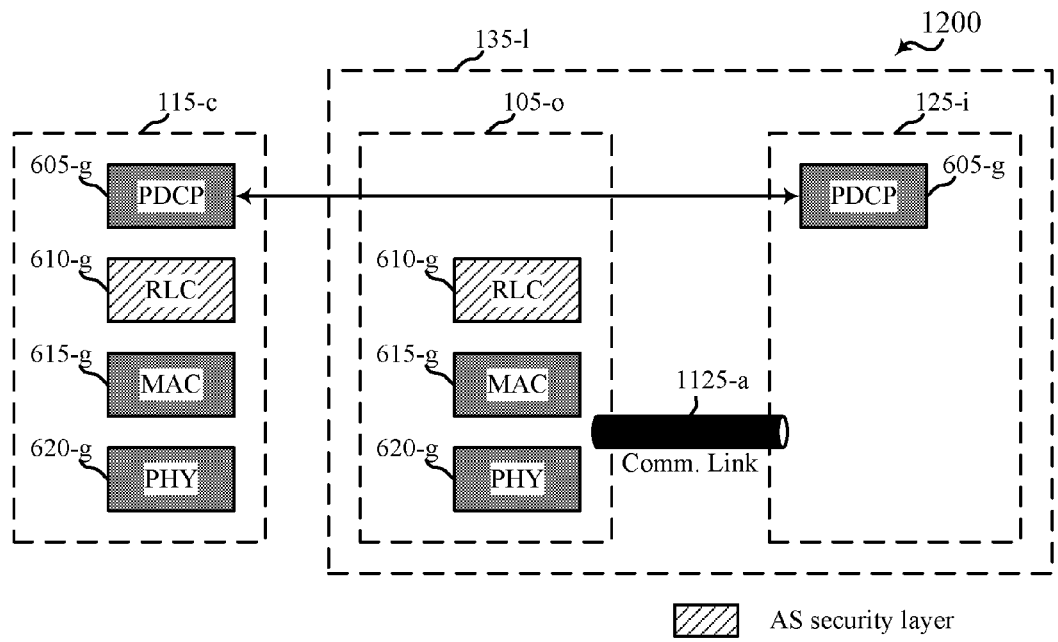

FIG. 12A shows another example 1200 of providing AS security protection for the UE 115-c described with reference to FIG. 11, in accordance with various aspects of the present disclosure. As shown, the UE 115-c may access a network via (or associate with) the network node 135-l. The network node 135-l may include a network access device (e.g., an RH) 105-o and a network access device controller (e.g., an ANC) 125-i. The communication link 1125-a may link the network access device 105-o to the network access device controller 125-i.

Each of the UE 115-c and the network node 135-1 may implement a protocol stack including a PDCP layer 605-g, an RLC layer 610-g, a MAC layer 615-g, and a PHY layer 620-g. On the network side, implementation or processing of the protocol stack may be split between the network access device 105-o and the network access device controller 125-i. By way of example, FIG. 12A shows the PDCP layer 605-g being processed by the network access device controller 125-i, and the RLC layer 610-g, the MAC layer 615-g, and the PHY layer 620-g being processed by the network access device 105-o.

In FIG. 12A, the network access device controller 125-i may determine that AS security protection for data packets transmitted to or received from the UE 115-c should be processed the RLC layer 610-g. Because AS security protection is to be processed at the RLC layer 610-g, and because the RLC layer 610-g is processed at the network access device 105-o instead of the network access device controller 125-i, the likelihood of an AS security protection-related performance bottleneck at the network access device controller 125-i may be mitigated.

Figure 12B:
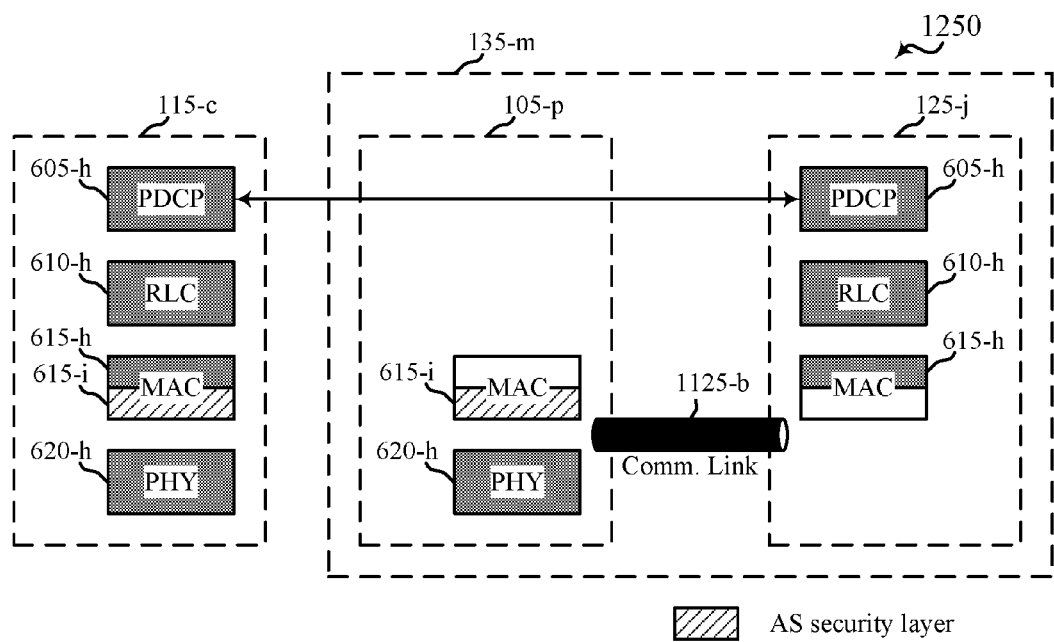

FIG. 12B shows another example 1250 of providing AS security protection for the UE 115-c described with reference to FIG. 11, in accordance with various aspects of the present disclosure. As shown, the UE 115-c may access a network via (or associate with) the network node 135-m. The network node 135-m may include a network access device (e.g., an RH) 105-p and a network access device controller (e.g., an ANC) 125-j. The communication link 1125-b may link the network access device 105-p to the network access device controller 125-j.

Each of the UE 115-c and the network node 135-m may implement a protocol stack including a PDCP layer 605-h, an RLC layer 610-h, an upper MAC layer 615-h, a lower MAC layer 615-i, and a PHY layer 620-h. On the network side, implementation or processing of the protocol stack may be split between the network access device 105-p and the network access device controller 125-j. By way of example, FIG. 12B shows the PDCP layer 605-h, the RLC layer 610-h, and the upper MAC layer 615-h being processed by the network access device controller 125-j, and lower MAC layer 615-i and PHY layer 620-h being processed by the network access device 105-p. In alternative examples, the RLC layer 610-h and/or upper MAC layer 615-h could be processed by the network access device 105-p instead of the network access device controller 125-j.

In FIG. 12B, the network access device controller 125-j may determine that AS security protection for data packets transmitted to or received from the UE 115-c should be processed at the lower MAC layer 615-i. Because AS security protection is processed at the lower MAC layer 615-i, and because the lower MAC layer 615-i is processed at the network access device 105-p instead of the network access device controller 125-j, the likelihood of an AS security protection-related performance bottleneck at the network access device controller 125-j may be mitigated.

A network access device controller 125 may determine that AS security for a UE should be processed at an upper protocol layer or a lower protocol layer (e.g., determine an AS security mode) based on one or more of a number of factors. For example, the network access device controller 125 may determine an AS security mode based on a load on at least one computational resource (e.g., a processor of the network access device controller 125), or a usage (e.g., congestion) level of at least one communication link (e.g., a communication link 1125 as described with reference to FIG. 11, 12A, or 12B), or a throughput of at least one communication link, or an identification of an attack (e.g., a flooding attack, a bogus packet injection, etc.), or a combination thereof. An AS security mode in which AS security protection is processed at a lower protocol layer (e.g., an RLC layer or a MAC layer) may be useful upon identifying high resource usage, link congestion, an attack, or low link throughput. An AS security mode in which AS security protection is processed at an upper protocol layer (e.g., a PDCP layer) may be useful because AS security protection at a PDCP layer can sometimes provide more flexibility and/or greater security protections.

Configurable AS security (e.g., AS security that may be processed at different protocol layers) may be provided in different ways. For example, configurable AS security may be provided based on a network-provisioned AS key or based on an on-demand AS key.

When configurable AS security is provided based on a network-provisioned AS key, a network access device controller (e.g., an ANC) 125 may be provided an AS key, $K_{ANC}$, by the network; while a UE 115 may derive the same AS key based on an authentication session key (e.g., $K_{ASME}$). $K_{ANC}$ may be used as a root key for generating UE-specific AS keys (denoted $K_{SRH}$) at network access devices 105 associated with the network access device controller 125. In some examples, $K_{ANC}$ may be equivalent to the key $K_{eNB}$ used in an LTE/LTE-A network.

The key derivation formula (KDF) for $K_{SRH}$ may be KDF($K_{ANC}$, SRH ID, HO COUNTER), where SRH ID is an identifier of a network access device 105, and HO COUNTER is a count of handovers of a UE (e.g., a count of handovers of the UE from one network access device 105 to another network access device 105) within a network node 135. The value of HO COUNTER may be incremented (or updated) when a new $K_{SRH}$ is derived for a UE, and prevents an old $K_{SRH}$ from being used when a UE 115 is handed back to a network access device 105 that previously operated as a serving network access device 105 for the UE 115.

When configurable AS security is provided based on a network-provisioned AS key and a UE 115 attaches to a new network access device 105 in a connected mode (e.g., when the UE participates in a connected mode handover), the UE 115 may derive a new $K_{SRH}$ and inform the network access device 105 to which it is handed over of its current HO COUNTER value. The new network access device 105 may then forward the HO COUNTER value to a network access device controller 125, with a request for a $K_{SRH}$ for the UE 115. After a connection between the UE 115 and the new network access device 105 is established, the UE 115 and the network access device controller 125 may each increment (or update) the value of HO COUNTER. When configurable AS security is provided based on a network-provisioned AS key and a UE 115 attaches to a new network access device 105 in an idle mode (e.g., when the UE transitions from an idle mode to a connected mode), the network may derive a new $K_{ANC}$ for AS security.

Figure 13:
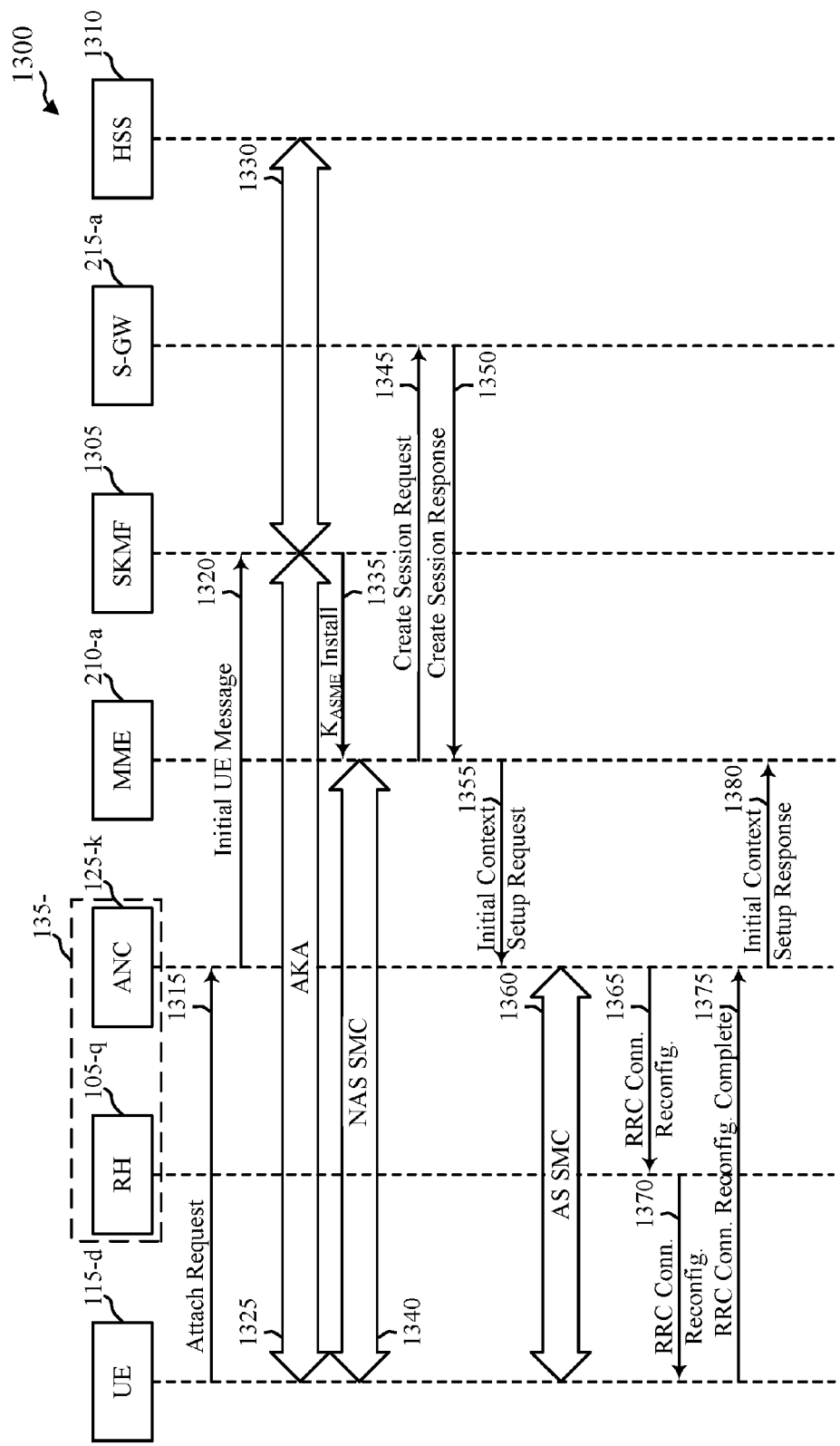
FIGS. 13 and 14 show communication flows in which communication occurs between a UE, a network access device, and a network access device controller, in accordance with various aspects of the present disclosure.

FIG. 13 shows a communication flow 1300 in which communication occurs between a UE 115-d, a network access device (e.g., an RH) 105-q, and a network access device controller (e.g., an ANC) 125-k, in accordance with various aspects of the present disclosure. Communication also occurs between the UE 115-d, network access device 105-q, network access device controller 125-k, and an MME 210-a, a secure key management facility (SKMF) 1305, an S-GW 215-a, and a home subscriber server (HSS) 1310. The UE 115-d may be an example of aspects of any one or more of the UEs 115 described with) reference to FIG. 1, 2, or 10-12; the network access device 105-q may be an example of aspects of any one or more of the network access devices 105 described with reference to FIG. 1-9, 11, or 12; and the network access device controller 125-k may be an example of aspects of any one or more of the network access device controllers 125 described with reference to FIG. 1-9, 11, or 12. In some examples the network access device 105-q and the network access device controller 125-k may be part of a network node 135-n, which may be an examples of aspects of any one or more of the network nodes 135 described with reference to FIGS. 1-12. FIG. 13 shows an example of the communications that may occur between a UE, a network access device, a network access device controller, and other devices when AS security is provided based on a network-provisioned AS key.

At 1315, the UE 115-d may transmit a connection request (e.g., an Attach Request) to the network access device controller 125-k. At 1320, the network access device controller 125-k may transmit an initial UE message to the SKMF 1305. At 1325, the UE may negotiate an authentication and key agreement (AKA) with the SKMF 1305. To negotiate the AKA, the SKMF 1305 may communicate with the HSS 1310 for the UE 115-d at 1330. As part of negotiating the AKA, at 1335, the SKMF 1305 may install a key, $K_{ASME}$, at the MME 210-a, and at 1340, the MME 210-a may transmit a non-access stratum (NAS) security mode command (SMC) to the UE 115-d, and NAS security may configured for the UE 115-d. At 1345, the MME 210-a may transmit a Create Session Request message to the S-GW 215-a; and at 1350, the S-GW 215-a may return a Create Session Response message to the MME 210-a. The MME 210-a may then transmit an Initial Context Setup Request to the network access device controller 125-k at 1355.

At 1360, the network access device controller 125-k may transmit an AS SMC to the UE 115-d, and AS security may be configured for the UE 115-d. As part of the AS security configuration, at 1365, the network access device controller 125-k may transmit an RRC Connection Reconfiguration message to the network access device 105-q. The RRC Connection Reconfiguration message transmitted to the network access device 105-q may include, for example, a UE identifier (UEID) for the UE 115-d, an AS security indication indicating an AS protocol layer (e.g., a PDCP layer, an RLC layer, a MAC layer, or a PHY layer) for protecting data packets transmitted to and received from the UE 115-d, and a UE-specific AS key ($K_{SRH}$). The AS security indication may also indicate a type of AS security protection, in which the type of AS security protection may include ciphering for data packets, integrity protection for data packets, or a combination thereof. In some examples, the AS security indication could also indicate no AS security protection for data packets. The UE-specific AS key may be installed at the network access device 105-q. Also as part of the AS security configuration, at 1370, the network access device 105-q may transmit an RRC Connection Reconfiguration message to the UE 115-d. The RRC Connection Reconfiguration message transmitted to the UE 115-d may include, for example, the UEID for the UE 115-d and the AS security indication.

At 1375, the UE 115-d may transmit an RRC Connection Reconfiguration Complete message to the network access device controller 125-k. At 1380, the network access device controller 125-k may transmit an Initial Context Setup Response to the MME 210-a.

When configurable AS security is provided based on an on-demand AS key, a network access device controller (e.g., an ANC) 125 may generate a master AS security key (MASK) using a random key generation process (e.g., the MASK may not be derived from any other key, and may only be known to the network access device controller). The network access device controller 125 may also generate a BS AS security key (BASK) for a network access device 105. In some examples, the network access device controller 125 may generate different BASKs for different network access devices 105. In other examples, the network access device controller 125 may generate a single BASK for each network access device 105 in a group of network access devices 105. The KDF for a BASK may be KDF(MASK, SRH ID), where SRH ID is an identifier of a network access device 105 or group of network access devices 105. A BASK may be provided to one or more of the network access devices 105 for which it is generated (or, for example, to a MAC layer of a network node having an all-in-one network access device and network access device controller). A MASK and one or more BASKs may be generated once by a network access device controller 125, and used for deriving UE-specific AS keys for multiple UEs 115. The network access device controller 125 may change the MASK, and the BASK(s), at any time.

A network access device controller 125 may further generate a device AS security key (DASK) for a UE 115. A DASK may be generated when needed (e.g., on-demand, during a random access procedure or a handover procedure). The KDF for a DASK may be KDF(BASK, UEID), where UEID is an identifier of the UE 115 for which the DASK is generated, and where UEID is unique with respect to the network access device controller 125 that generates the DASK. In some examples, the UEID may be a cell radio network temporary identifier (C-RNTI). A DASK may be provisioned to a UE 115 during AS security setup. A DASK may be transmitted to a UE 115 using a secure RRC message (e.g., as part of an AS SMC).

Figure 14:
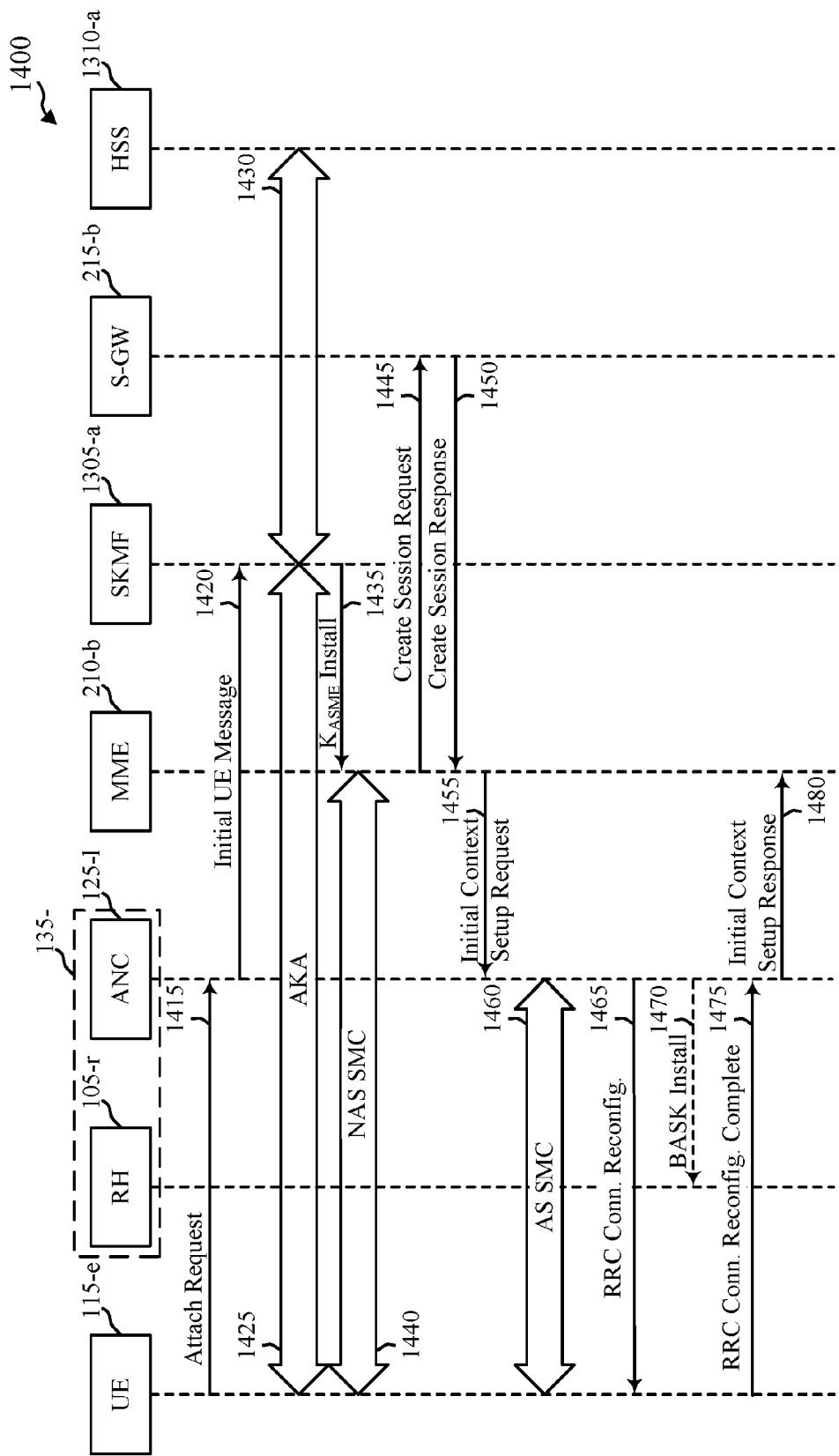

FIG. 14 shows a communication flow 1400 in which communication occurs between a UE 115-e, a network access device (e.g., an RH) 105-r, and a network access device controller (e.g., an ANC) 125-l, in accordance with various aspects of the present disclosure. Communication also occurs between the UE 115-e, network access device 105-r, network access device controller 125-l, and an MME 210-b, an SKMF 1305-a, an S-GW 215-b, and an HSS 1310-a. The UE 115-e may be an example of aspects of any one or more of the UEs 115 described with reference to FIG. 1, 2, or 10-13; the network access device 105-r may be an example of aspects of any one or more of the network access devices 105 described with reference to FIG. 1-9 or 11-13; and the network access device controller 125-*l* may be an example of aspects of any one or more of the network access device controllers 125 described with reference to FIG. 1-9 or 11-13. In some examples the network access device 105-*r* and the network access device controller 125-*l* may be part of a network node 135-*o*, which may be an examples of aspects of any one or more of the network nodes 135 described with reference to FIGS. 1-13. FIG. 14 shows an example of the communications that may occur between a UE, a network access device, a network access device controller, and other devices when AS security is provided based on an on-demand AS key.

At 1415, the UE 115-*e* may transmit a connection request (e.g., an Attach Request) to the network access device controller 125-*l*. At 1420, the network access device controller 125-1 may transmit an initial UE message to the SKMF 1305-*a*. At 1425, the UE may negotiate an AKA with the SKMF 1305-*a*. To negotiate the AKA, the SKMF 1305-*a* may communicate with the HSS 1310-*a* for the UE 115-*e* at 1430. As part of negotiating the AKA, at 1435, the SKMF 1305-*a* may install a key, $K_{ASME}$, at the MME 210-*b*, and at 1440, the MME 210-*b* may transmit a NAS SMC to the UE 115-*e*, and NAS security may be configured for the UE 115-*e*.

At 1445, the MME 210-*b* may transmit a Create Session Request message to the S-GW 215-*b*; and at 1450, the S-GW 215-*b* may return a Create Session Response message to the MME 210-*b*. The MME 210-*b* may then transmit an Initial Context Setup Request to the network access device controller 125-*l* at 1455.

At 1460, the network access device controller 125-*l* may transmit an AS SMC to the UE 115-*e*, and AS security may be configured for the UE 115-*e*. As part of the AS security configuration, at 1465, the network access device controller 125-*l* may transmit an RRC Connection Reconfiguration message to the UE 115-*e*. The RRC Connection Reconfiguration message transmitted to the UE 115-*e* may include, for example, a UEID for the UE 115-*e*, an AS security indication indicating an AS protocol layer (e.g., a PDCP layer, an RLC layer, or a MAC layer) for protecting data packets transmitted to and received from the UE 115-*e*, and a DASK for the UE 115-*e*. The AS security indication may also indicate a type of AS security protection, in which the type of AS security protection may include ciphering for data packets, integrity protection for data packets, or a combination thereof. In some examples, the AS security indication could also indicate no AS security protection for data packets. Also as part of the AS security configuration, at 1470, the network access device controller 125-*l* may optionally transmit an RRC Connection Reconfiguration message to the network access device 105-*r*. The RRC Connection Reconfiguration message transmitted to the network access device 105-*r* may include, for example, a BASK. In some examples, the BASK may be transmitted to the network access device 105-*r* prior to the communication flow 1400, or at a time that is not dependent on the timing of the communication flow 1400 (e.g., because the BASK is a network access device-specific AS key, and is not UE-specific, the BASK may have been previously provisioned to the network access device 105-*r* and may not need to be transmitted (e.g., provisioned) as part of the communication flow 1400).

At 1475, the UE 115-*e* may transmit an RRC Connection Reconfiguration Complete message to the network access device controller 125-*l*. At 1480, the network access device controller 125-*l* may transmit an Initial Context Setup Response to the MME 210-*b*.

Following the communication flow 1400 (e.g., once contention is resolved), the UE 115-*e* and network access device 105-*r* may exchange nonces. For example, the network access device 105-*r* may transmit a $Nonce_{SRH}$ to the UE 115-*e*, and the UE 115-*e* may transmit a $Nonce_{UE}$ to the network access device 105-*r*. The $Nonce_{SRH}$ may be the first message transmitted by the network access device 105-*r* after contention resolution (e.g., in a message similar to message 4 in LTE/LTE-A), and the $Nonce_{UE}$ may be the first message transmitted by the UE 115-*e* after contention resolution (e.g., in a message similar to message 5 in LTE/LTE-A).

When MAC layer AS security is configured, the UE 115-*e* and network access device 105-*r* may derive a MAC layer AS key based on a DASK and exchanged nonces (e.g., MAC layer AS security key=KDF(DASK, $Nonce_{SRH}|Nonce_{UE}$)). The UE 115-*e* and network access device 105-*r* may also initialize and/or synchronize an uplink data packet counter and a downlink packet counter for the MAC layer AS security. The UE 115-*e* and network access device 105-*r* may each increment (or update) the uplink data packet counter for each uplink data packet (e.g., each message protocol data unit (MPDU)) transmitted by the UE 115-*e*, and may each increment (or update) the downlink data packet counter for each downlink data packet transmitted to the UE 115-*e*. At least a portion of the uplink data packet counter or downlink data packet counter may be included in each MAC PDU header. MAC layer AS security may be enabled when the UE 115-*e* is in a connected mode. RLC layer AS security may be employed and configured similarly to MAC layer AS security.

In some examples of configurable AS security using an on-demand AS key, a common BASK may be derived for a group of network access devices 105. A group of network access devices 105 may be defined, in some examples, based on SRH IDs. Deriving a single BASK for a group of network access devices 105 may improve network efficiency, especially for a network node 135 experiencing frequent intra-node handovers of UEs 105. Because the security of the network access devices 105 included in a group is under the control of a common network access device controller 125, the network access device controller 125 may detect when a network access device 105 has been compromised and remove the network access device 105 from the group and/or isolate the network access device 105 from the network. BASK sharing can reduce the overhead of deriving and provisioning DASKs to UEs 115 during intra-node (e.g., intra-AN) handovers (e.g., handovers from a first network access device (e.g., a first RH) 105 to a second network access device (e.g., a second RH) 105, where the first network access device 105 and the) second network access device 105 are associated with a same network access device controller 125 (e.g., a same ANC)).

In some examples of configurable AS security using an on-demand AS key, a network access device controller 125 may periodically change its MASK. In some examples, a MASK may be determined based on a MASK index, and each change in the MASK may be associated with a defined change in the MASK index. A BASK may be determined based on a BASK index, which BASK index is determined by the MASK index. Similarly, a DASK may be determined based on a DASK index, which DASK index is determined by the BASK index. The network access device controller 125 may provision a network access device 105 with a BASK and a corresponding BASK index, and may provision a UE 115 with a DASK and a corresponding DASK index. A key index (e.g., the last bit of the index) may be included in a message so that a receiver can determine which DASK should be used for AS security verification during DASK rollover. A network access device controller 125 may inform a UE 115 of a BASK change and of a corresponding DASK using a secure RRC message.

Figure 15:
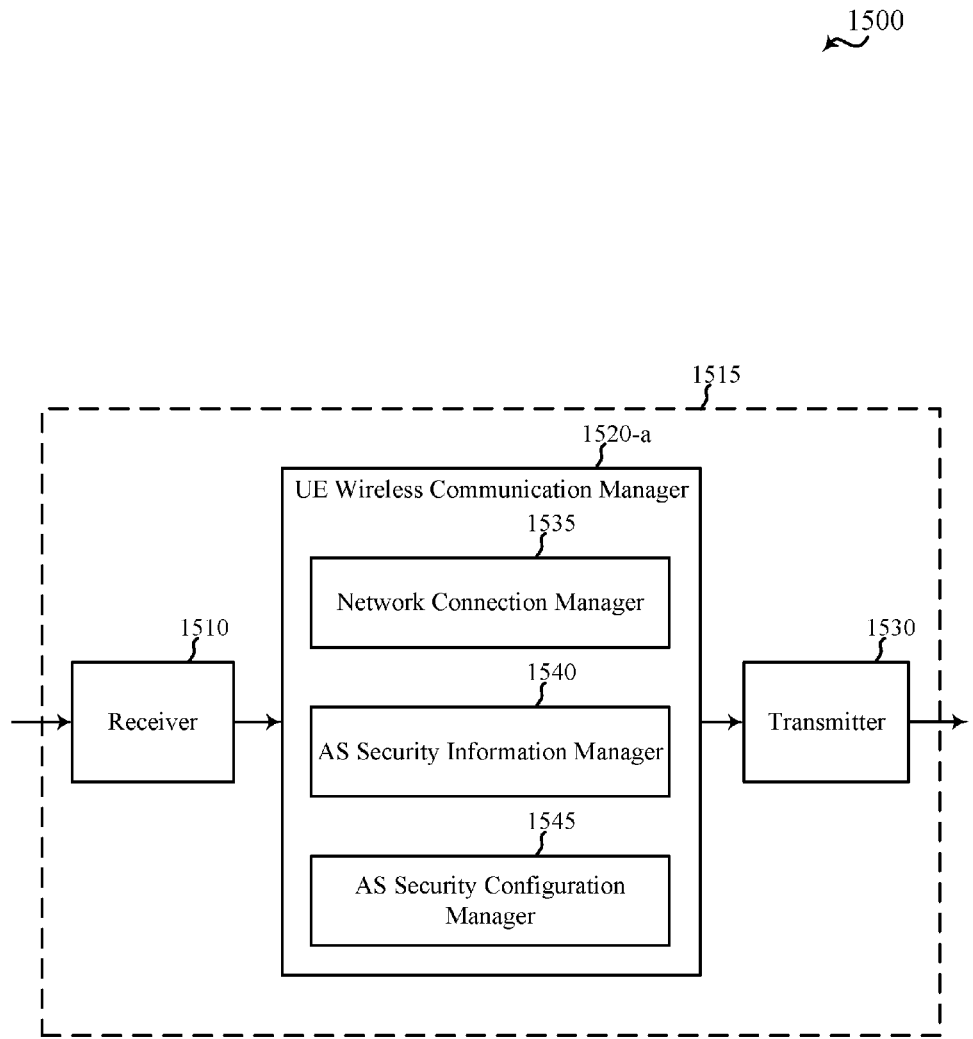
FIG. 15 shows a block diagram of an apparatus that supports configurable AS security, in accordance with various aspects of the present disclosure.

FIG. 15 shows a block diagram 1500 of an apparatus 1515 that supports configurable AS security, in accordance with various aspects of the present disclosure. The apparatus 1515 may be an example of aspects of one or more of the UEs 115 described with reference to FIG. 1, 2, 10, 11, 12A, 12B, 13, or 14. The apparatus 1515 may also be or include a processor. The apparatus 1515 may include a receiver 1510, a UE wireless communication manager 1520-a, and a transmitter 1530. Each of these components may be in communication with each other.

The components of the apparatus 1515 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1510 may include at least one RF receiver, such as at least one RF receiver operable to receive transmissions over one or more radio frequency spectrum bands. In some examples, the receiver 1510 may include an array of receive antennas. In some examples, the one or more radio frequency spectrum bands may be used for LTE/LTE-A or 5G communications, as described herein. The receiver 1510 may be used to receive various types of data or control signals (e.g., transmissions) over one or more communication links (or channels) of a wireless communication system, such as one or more communication links (or channels) of the wireless communication system 100 described with reference to FIG. 1. In some examples, the receiver 1510 may also or alternatively include one or more wired receivers.

In some examples, the transmitter 1530 may include at least one RF transmitter, such as at least one RF transmitter operable to transmit over one or more radio frequency spectrum bands. In some examples, the transmitter 1530 may include an array of transmit antennas. In some examples, the one or more radio frequency spectrum bands may be used for LTE/LTE-A or 5G communications, as described herein. The transmitter 1530 may be used to transmit various types of data or control signals (e.g., transmissions) over one or more communication links (or channels) of a wireless communication system, such as one or more communication links 122 (or channels) of the wireless communication system 100 described with reference to FIG. 1. In some examples, the transmitter 1530 may also or alternatively include one or more wired transmitters.

In some examples, the UE wireless communication manager 1520-a may be used to manage one or more aspects of wireless communication for the apparatus 1515. In some examples, part of the UE wireless communication manager 1520-a may be incorporated into or shared with the receiver 1510 or the transmitter 1530. In some examples, the UE wireless communication manager 1520-a may be an example of aspects of the UE wireless communication manager 1520 described with reference to FIG. 1. In some examples, the UE wireless communication manager 1520-a may include a network connection manager 1535, an AS security information manager 1540, or an AS security configuration manager 1545.

The network connection manager 1535 may be used to establish (e.g., in cooperation with the receiver 1510 and/or the transmitter 1530) a connection with a network node, such as one of the network node 135 as described with reference to FIGS. 1-14. In some examples, the connection with the network node may be established through a network access device of the network node (e.g., one of the network access devices (e.g., RHs) 105 described with reference to FIG. 1-9, or 11-14). In some examples, establishing the connection with the network node may include performing a random access procedure, and the network connection manager 1535 may transmit to the network node, while performing the random access procedure, a connection request. In other examples, the connection with the network node may be established during a handover of a UE including the apparatus 1515 from a first network access device 105 to a second network access device 105. In some examples, network connection manager 1535 may transmit to the network node, as part of establishing the connection, an indication of an AS security capability of the UE. In some examples, the indication of the AS security capability may be transmitted to the network node with a connection request. The indication of the AS security capability may indicate, in some examples, at least one of a PDCP layer security capability, or an RLC layer security capability, or a MAC layer security capability, or a combination thereof.

The AS security information manager 1540 may be used to receive (e.g., in cooperation with the receiver 1510) from the network node, as part of establishing the connection with the network node, an AS security indication indicating an AS protocol layer for protecting data packets. In some examples, the AS security indication may indicate at least one of a PDCP layer security, or an RLC layer security, or a MAC layer security, or a combination thereof. In some examples, configuring AS security protection for data packets may include configuring ciphering for data packets, configuring integrity protection for data packets, or a combination thereof. Configuring AS security protection could also include configuring no AS security protection for data packets. In some examples, the type of AS protection configured for data packets may be based at least in part on a type of AS security protection indicated in the AS security indication. In some examples, the AS protocol layer indicated by the AS security indication may be based at least in part on an AS security capability of the UE.

The AS security configuration manager 1545 may be used to configure AS security protection for data packets based at least in part on the AS security indication and the indicated AS protocol layer.

Figure 16:
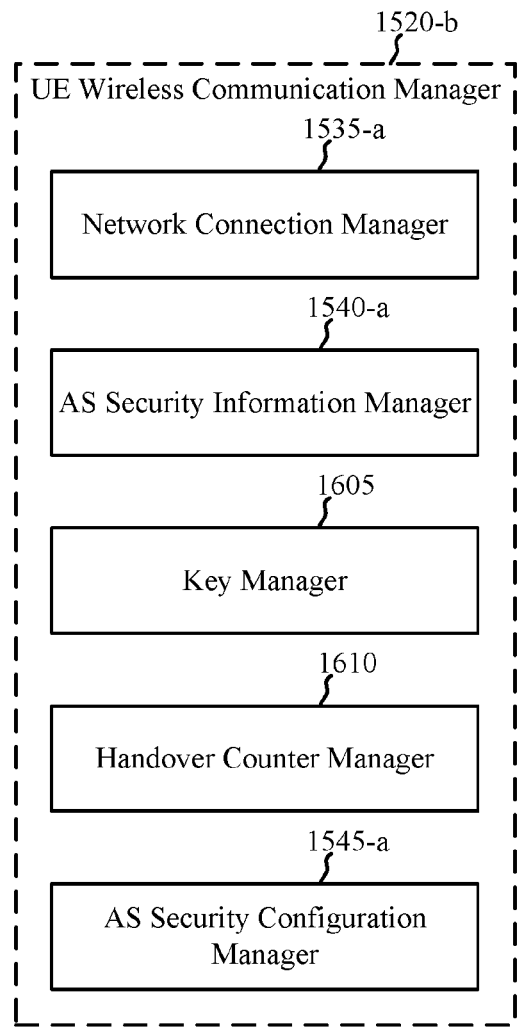
FIG. 16 shows a block diagram of a UE wireless communication manager that supports configurable AS security, in accordance with various aspects of the present disclosure.

FIG. 16 shows a block diagram 1600 of a UE wireless communication manager 1520-b that supports configurable AS security, in accordance with various aspects of the present disclosure. The UE wireless communication manager 1520-b may be an example of aspects of a UE wireless communication managers 1520 described with reference to FIG. 1 or 15.

The components of the UE wireless communication manager 1520-b may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the UE wireless communication manager 1520-*b* may be used to manage one or more aspects of wireless communication for a UE or apparatus, such as one of the UEs 115 described with reference to FIG. 1, 2, 10, 11, 12A, 12B, 13, or 14, or one of the apparatus 1515 described with reference to FIG. 15. In some examples, part of the UE wireless communication manager 1520-*b* may be incorporated into or shared with a receiver or a transmitter (e.g., the receiver 1510 or the transmitter 1530 described with reference to FIG. 15). In some examples, the UE wireless communication manager 1520-*b* may include a network connection manager 1535-*a*, an AS security information manager 1540-*a*, a key manager 1605, a handover counter manager 1610, or an AS security configuration manager 1545-*a*.

The network connection manager 1535-*a* may be used to establish (e.g., in cooperation with a transmitter and/or a receiver) a connection with a network node, such as one of the network nodes 135 described with reference to FIGS. 1-14. In some examples, the connection with the network node may be established through a network access device of the network node (e.g., one of the network access devices (e.g., RHs) 105 described with reference to FIG. 1-9, or 11-14). In some examples, establishing the connection with the network node may include performing a random access procedure, and the network connection manager 1535-*a* may transmit to the network node, while performing the random access procedure, a connection request. In other examples, the connection with the network node may be established during a handover of a UE including the UE wireless communication manager 1520-*b* from a first network access device to a second network access device. In some examples, network connection manager 1535-*a* may transmit to the network node, as part of establishing the connection, an indication of an AS security capability of the UE. In some examples, the indication of the AS security capability may be transmitted to the network node with a connection request. The indication of the AS security capability may indicate, in some examples, at least one of a PDCP layer security capability, or an RLC layer security capability, or a MAC layer security capability, or a combination thereof. In some examples, the network connection manager 1535-*a* may transmit to the network node, as part of establishing the connection, a count of handovers of the UE (e.g., a count of handovers of the UE from one network access device to another network access device) within the network node.

The AS security information manager 1540-*a* may be used to receive (e.g., in cooperation with a receiver) from the network node, as part of establishing the connection with the network node, an AS security indication indicating an AS protocol layer for protecting data packets. In some examples, the AS security indication may indicate at least one of a PDCP layer security, or an RLC layer security, or a MAC layer security, or a combination thereof. The AS security indication may also indicate a type of AS security protection, in which the type of AS security protection may include ciphering for data packets, integrity protection for data packets, or a combination thereof. The AS security indication could also indicate no AS security protection for data packets. In some examples, the AS protocol layer indicated by the AS security indication may be based at least in part on an AS security capability of the UE.

In one example, the key manager 1605 may be used to derive, as part of establishing the connection, a UE-specific AS key based at least in part on a key associated with a network access device controller associated with a serving network access device for the UE. In some examples, the UE-specific AS key may be further based on an identifier of the serving network access device for the UE and the count of handovers. After establishing the connection with the network node, the count of handovers may be increased (or updated to a next value) using the handover counter manager 1610.

In another example, the key manager 1605 may be used to receive (e.g., in cooperation with a receiver) from the network node, as part of establishing the connection, a UE-specific AS key. The UE-specific key may be based at least in part on a key associated with a serving network access device for the UE, and an identifier of the UE. In some examples, the UE-specific AS key may be received along with the AS security indication. The key manager 1605 may also be used to exchange nonces with a serving network access device for the UE, and to derive an AS security protection key based at least in part on the UE-specific AS key and the exchanged nonces. In some examples, the key manager 1605 may receive a UE-specific AS key in response to the UE wireless communication manager 1520-*b* performing a random access procedure (e.g., an initial attach to a network node), but not during an intra-network node handover of the UE. In the case of an intra-network node handover of the UE, an AS protection key may be derived from a UE-specific AS key that was previously received from the network node.

The AS security configuration manager 1545-*a* may be used to configure AS security protection for data packets based at least in part on the AS security indication, the indicated AS protocol layer, and a derived AS key (e.g., the UE-specific AS key derived by the key manager 1605 or the AS security protection key derived by the key manager 1605). In some examples, configuring AS security protection for data packets may include configuring ciphering for data packets, or configuring integrity protection for data packets, or a combination thereof. Configuring AS security protection may also include configuring no AS security protection for data packets. In some examples, the type of AS protection configured for data packets may be based at least in part on a type of AS security protection indicated in the AS security indication. In some examples, AS security configuration manager 1545-*a* may be used to synchronize an uplink data packet counter and a downlink data packet counter with the serving network access device. The uplink data packet counter and the downlink data packet counter may be maintained at the PDCP layer, or the RLC layer, or the MAC layer, in accordance with the AS security indication.

Figure 17:
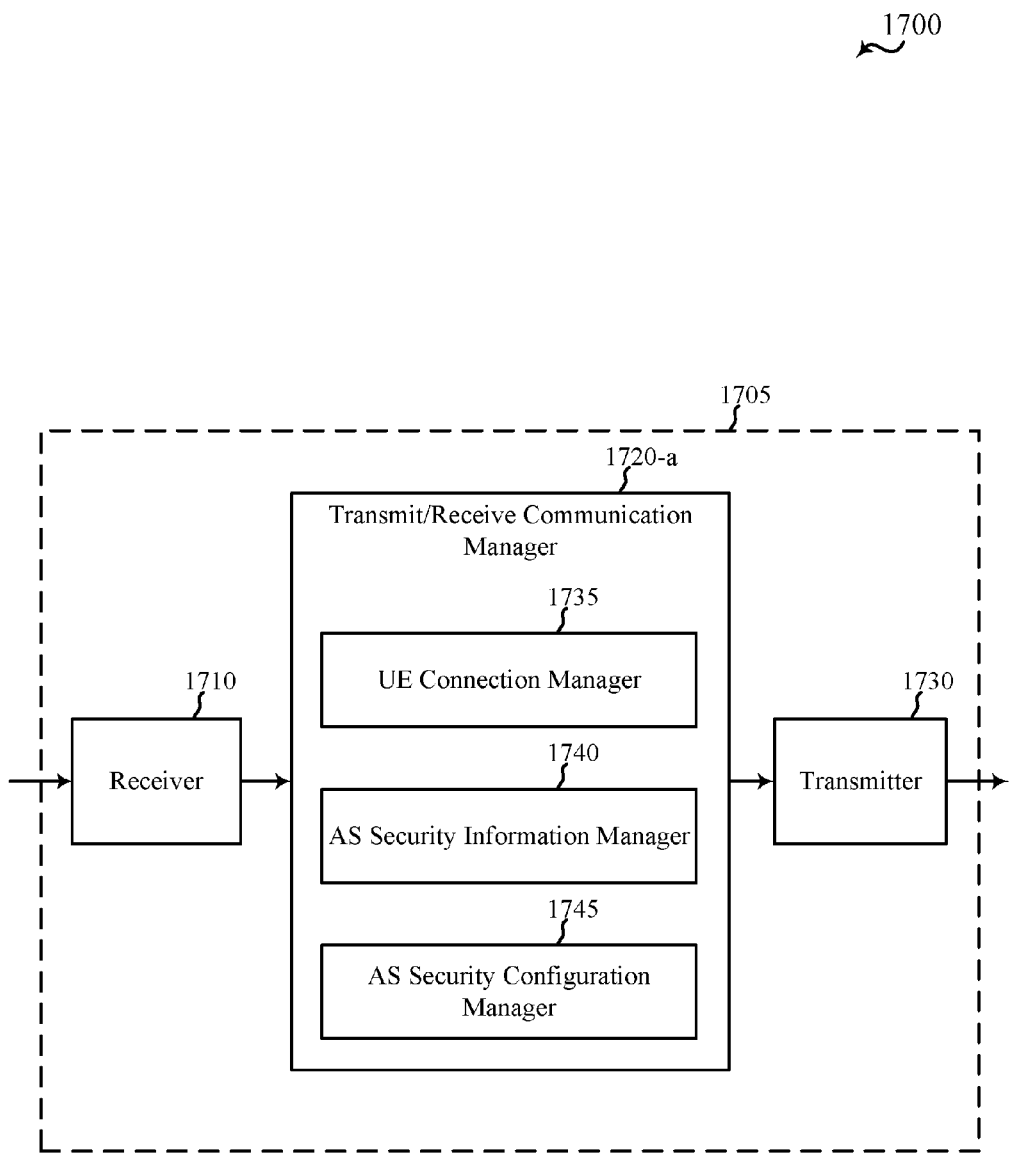
FIG. 17 shows a block diagram of an apparatus that supports configurable AS security, in accordance with various aspects of the present disclosure.

FIG. 17 shows a block diagram 1700 of an apparatus 1705 that supports configurable AS security, in accordance with various aspects of the present disclosure. The apparatus 1705 may be an example of aspects of one or more of the network nodes 135 described with reference to FIGS. 1-14, including, for example, aspects of one or more of the network access devices 105 described with reference to FIG. 1-9 or 11-14. The apparatus 1705 may also be or include a processor. The apparatus 1705 may include a receiver 1710, a transmit/receive communication manager 1720-*a*, and a transmitter 1730. Each of these components may be in communication with each other.

The components of the apparatus 1705 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1710 may include at least one RF receiver, such as at least one RF receiver operable to receive transmissions over one or more radio frequency spectrum bands. In some examples, the receiver 1710 may include an array of receive antennas. In some examples, the one or more radio frequency spectrum bands may be used for LTE/LTE-A or 5G communications, as described herein. The receiver 1710 may be used to receive various types of data or control signals (e.g., transmissions) over one or more communication links (or channels) of a wireless communication system, such as one or more communication links 122 (or channels) of the wireless communication system 100 described with reference to FIG. 1. In some examples, the receiver 1710 may also or alternatively include one or more wired receivers.

In some examples, the transmitter 1730 may include at least one RF transmitter, such as at least one RF transmitter operable to transmit over one or more radio frequency spectrum bands. In some examples, the transmitter 1730 may include an array of transmit antennas. In some examples, the one or more radio frequency spectrum bands may be used for LTE/LTE-A or 5G communications, as described herein. The transmitter 1730 may be used to transmit various types of data or control signals (e.g., transmissions) over one or more communication links (or channels) of a wireless communication system, such as one or more communication links 122 (or channels) of the wireless communication system 100 described with reference to FIG. 1. In some examples, the transmitter 1730 may also or alternatively include one or more wired transmitters.

In some examples, the transmit/receive communication manager 1720-*a* may be used to manage one or more aspects of wireless communication for the apparatus 1705. In some examples, part of the transmit/receive communication manager 1720-*a* may be incorporated into or shared with the receiver 1710 or the transmitter 1730. In some examples, the transmit/receive communication manager 1720-*a* may be an example of aspects of the transmit/receive communication manager 1720 described with reference to FIG. 1. In some examples, the transmit/receive communication manager 1720-*a* may include a UE connection manager 1735, an AS security information manager 1740, or an AS security configuration manager 1745.

The UE connection manager 1735 may be used to establish (e.g., in cooperation with the receiver 1710 and/or the transmitter 1730) a connection with a UE. In some examples, the connection with the UE may be established in response to receiving a connection request from the UE. In some examples, the connection request may be received while the UE is performing a random access procedure with a network access device including the apparatus 1705. In other examples, the connection with the UE may be established during a handover of the UE to the network access device. In some examples, the UE connection manager 1735 may receive from the UE, as part of establishing the connection with the UE, an indication of an AS security capability of the UE. In some examples, the indication of the AS security capability may be received from the UE with a connection request. The indication of the AS security capability may indicate, in some examples, at least one of a PDCP layer security capability, or an RLC layer security capability, or a MAC layer security capability, or a combination thereof.

When the UE connection manager 1735 has received a connection request from the UE, the UE connection manager 1735 may forward (e.g., in cooperation with the transmitter 1730) at least a part of the connection request (e.g., an identity of the UE, an indication of an AS security capability of the UE, and/or a count of handovers of the UE within a network node to which the network access device belongs) to a network access device controller. In some examples, the network access device controller may be one of the network access device controllers 125 described with reference to FIG. 1-9, or 11-14.

The AS security information manager 1740 may be used to receive (e.g., in cooperation with the receiver 1710) from the network access device controller, as part of establishing the connection with the UE, an AS security indication indicating an AS protocol layer for protecting data packets. In some examples, the AS security indication may indicate at least one of a PDCP layer security, or an RLC layer security, or a MAC layer security, or a combination thereof. In some examples, the AS protocol layer indicated by the AS security indication may be based at least in part on an AS security capability of the UE. In some examples, the AS security indication received by the AS security information manager 1740 may be received with a connection response from the network access device controller (e.g., a response to receiving at least part of a connection request forwarded to the network access device controller). In other examples, the AS security indication may be received from the network access device controller during a handover of the UE to the network access device.

The AS security configuration manager 1745 may be used to configure AS security protection for data packets transmitted to or received from the UE based at least in part on the AS security indication and the indicated AS protocol layer. In some examples, configuring AS security protection for data packets may include configuring ciphering for data packets, configuring integrity protection for data packets, or a combination thereof. Configuring AS security protection could also include configuring no AS security protection for data packets. In some examples, the type of AS protection configured for data packets may be based at least in part on a type of AS security protection indicated in the AS security indication. In some examples, configuring AS security protection for data packets may include forwarding the AS security indication received by the AS security information manager 1740, or forwarding at least a part of a connection response received by the AS security information manager 1740 (e.g., at least the AS security indication), to the UE.

Figure 18:
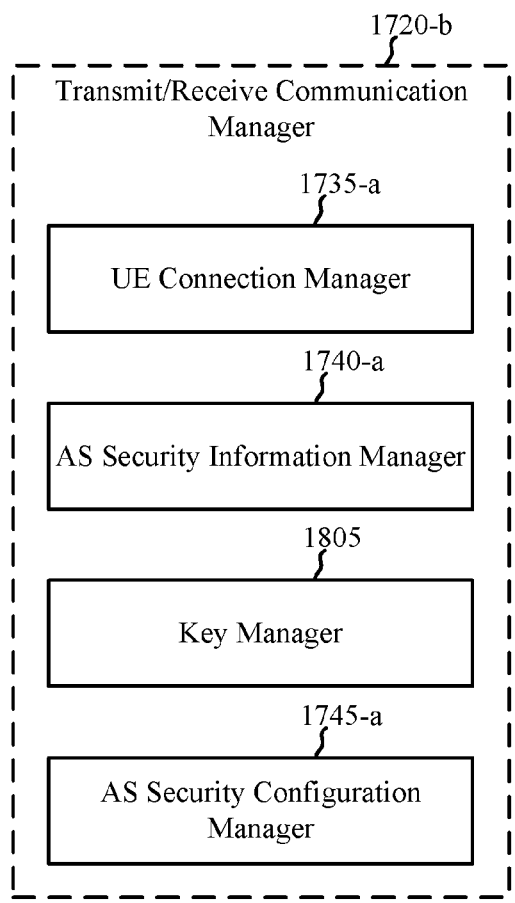
FIG. 18 shows a block diagram of a transmit/receive communication manager that supports configurable AS security, in accordance with various aspects of the present disclosure.

FIG. 18 shows a block diagram 1800 of a transmit/receive communication manager 1720-*b* that supports configurable AS security, in accordance with various aspects of the present disclosure. The transmit/receive communication manager 1720-*b* may be an example of aspects of a transmit/receive communication managers 1720 described with reference to FIG. 1 or 17.

The components of the transmit/receive communication manager 1720-b may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the transmit/receive communication manager 1720-b may be used to manage one or more aspects of wireless communication for a network node 135 as described with reference to FIGS. 1-12, including, for example, aspects of one or more of the network access devices 105 described with reference to FIG. 1-9 or 11-14, or one of the apparatus 1705 described with reference to FIG. 17. In some examples, part of the transmit/receive communication manager 1720-b may be incorporated into or shared with a receiver or a transmitter (e.g., the receiver 1710 or the transmitter 1730 described with reference to FIG. 17). In some examples, the transmit/receive communication manager 1720-b may include a UE connection manager 1735-a, an AS security information manager 1740-a, a key manager 1805, or an AS security configuration manager 1745-a.

The UE connection manager 1735-a may be used to establish (e.g., in cooperation with a transmitter and/or a receiver) a connection with a UE. In some examples, the connection with the UE may be established in response to receiving a connection request from the UE. In some examples, the connection request may be received while the UE is performing a random access procedure with a network access device including the transmit/receive communication manager 1720-b. In other examples, the connection with the UE may be established during a handover of the UE to the network access device. In some examples, the UE connection manager 1735-a may receive from the UE, as part of establishing the connection with the UE, an indication of an AS security capability of the UE. In some examples, the indication of the AS security capability may be received from the UE with a connection request. The indication of the AS security capability may indicate, in some examples, at least one of a PDCP layer security capability, or an RLC layer security capability, or a MAC layer security capability, or a combination thereof.

When the UE connection manager 1735-a has received a connection request from the UE, the UE connection manager 1735-a may forward (e.g., in cooperation with a transmitter) at least a part of the connection request (e.g., an identity of the UE, an indication of an AS security capability of the UE, and/or a count of handovers of the UE within a network node to which the network access device belongs) to a network access device controller. In some examples, the network access device controller may be one of the network access device controllers 125 described with reference to FIG. 1-9, or 11-14).

The AS security information manager 1740-a may be used to receive from the network access device controller, as part of establishing the connection with the UE, an AS security indication indicating an AS protocol layer for protecting data packets. In some examples, the AS security indication may indicate at least one of a PDCP layer security, or an RLC layer security, or a MAC layer security, or a combination thereof. The AS security indication may also indicate a type of AS security protection, in which the type of AS security protection may include ciphering for data packets, integrity protection for data packets, or a combination thereof. The AS security indication may also indicate no AS security protection for data packets. In some examples, the AS protocol layer indicated by the AS security indication may be based at least in part on an AS security capability of the UE. In some examples, the AS security indication received by the AS security information manager 1740-a may be received with a connection response from the network access device controller (e.g., a response to receiving at least part of a connection request forwarded to the network access device controller). In other examples, the AS security indication may be received from the network access device controller during a handover of the UE to the network access device.

In one example, the key manager 1805 may be used to receive (e.g., in cooperation with a receiver) from the network access device controller, as part of establishing the connection with the UE, a UE-specific AS key for the UE. In some examples, the UE-specific AS key may be based at least in part on a key associated with the network access device controller, an identifier of the network access device, and a count of handovers.

In another example, the key manager 1805 may be used to receive from the network access device controller, a network access device-specific AS key. The network access device-specific AS key may be received as part of establishing the connection with the UE, or at a time prior to establishing the connection with the UE. The network access device-specific key may be based at least in part on a key associated with the network access device controller. The key manager 1805 may also be used to exchange nonces with the UE, and to derive an AS security protection key based at least in part on the UE-specific AS key and the exchanged nonces.

The AS security configuration manager 1745-a may be used to configure AS security protection for data packets transmitted to or received from the UE based at least in part on the AS security indication, the indicated AS protocol layer, and an AS key (e.g., the UE-specific AS key received by the key manager 1805 or the AS security protection key derived by the key manager 1805). In some examples, configuring AS security protection for data packets may include configuring ciphering for data packets, configuring integrity protection for data packets, or a combination thereof. Configuring AS security protection could also include configuring no AS security protection for data packets. In some examples, the type of AS protection configured for data packets may be based at least in part on a type of AS security protection indicated in the AS security indication.

In some examples, configuring AS security protection for data packets may include forwarding the AS security indication received by the AS security information manager 1740-a, or forwarding at least a part of a connection response received by the AS security information manager 1740-a (e.g., at least the AS security indication), to the UE. In some examples, the AS security configuration manager 1745-a may be used to synchronize an uplink data packet counter and a downlink data packet counter with the UE. The uplink data packet counter and the downlink data packet counter may be maintained at the PDCP layer, or the RLC layer, or the MAC layer, in accordance with the AS security indication received from the network access device controller.

Figure 19:
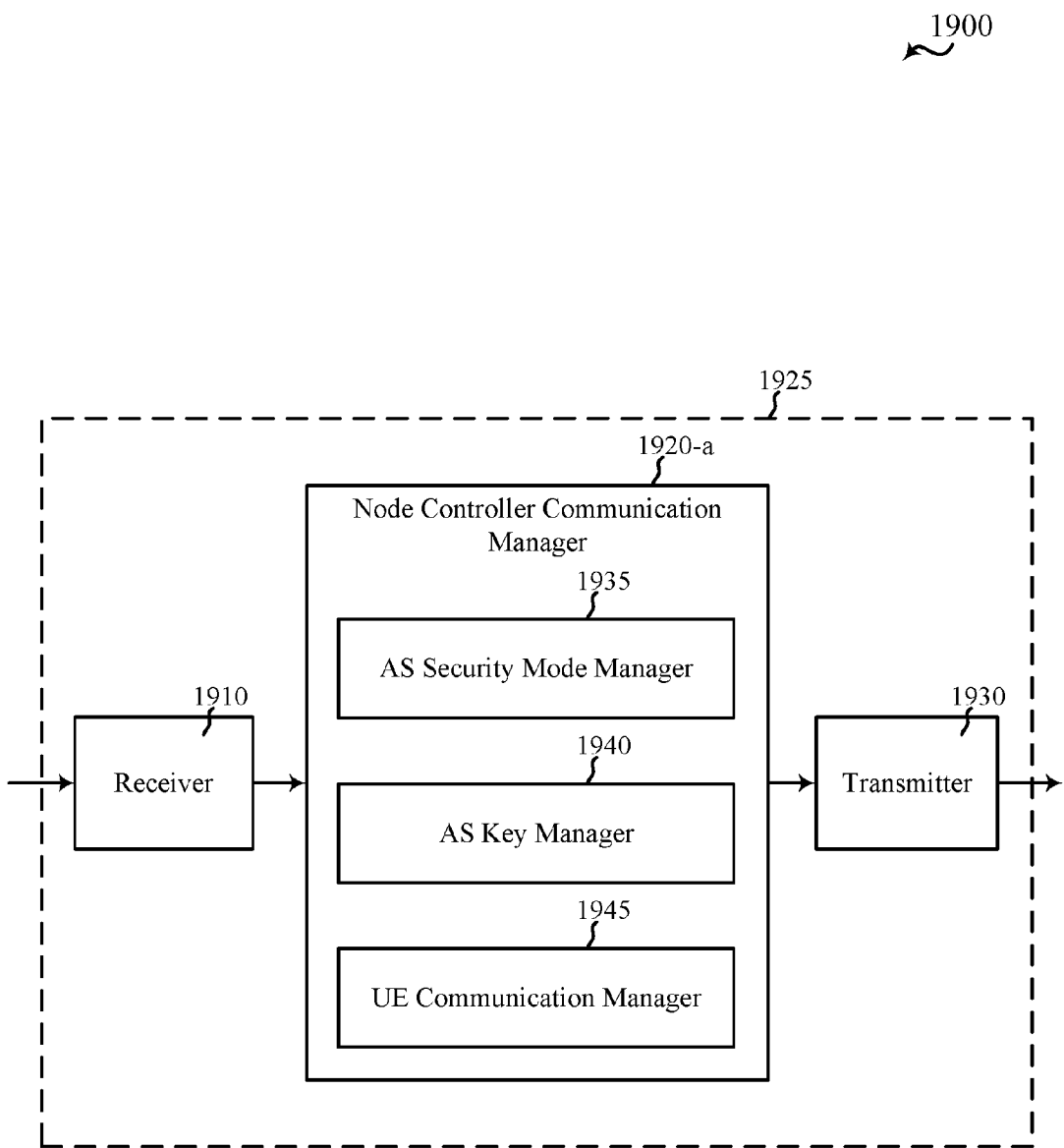
FIG. 19 shows a block diagram of an apparatus that supports configurable AS security, in accordance with various aspects of the present disclosure.

FIG. 19 shows a block diagram 1900 of an apparatus 1925 that supports configurable AS security, in accordance with various aspects of the present disclosure. The apparatus 1925 may be an example of aspects of one or more of the network nodes 135 described with reference to FIGS. 1-14, including, for example, aspects of one or more of the network access device controllers 125 described with reference to FIG. 1-9 or 11-14. The apparatus 1925 may also be or include a processor. The apparatus 1925 may include a receiver 1910, a node controller communication manager 1920-a, and a transmitter 1930. Each of these components may be in communication with each other.

The components of the apparatus 1925 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1910 may include at least one RF receiver, such as at least one RF receiver operable to receive transmissions over one or more radio frequency spectrum bands. In some examples, the receiver 1910 may include an array of receive antennas. In some examples, the one or more radio frequency spectrum bands may be used for LTE/LTE-A or 5G communications, as described herein. The receiver 1910 may be used to receive various types of data or control signals (e.g., transmissions) over one or more communication links (or channels) of a wireless communication system, such as one or more communication links (or channels) of the wireless communication system 100 described with reference to FIG. 1. In some examples, the receiver 1910 may also or alternatively include one or more wired receivers.

In some examples, the transmitter 1930 may include at least one RF transmitter, such as at least one RF transmitter operable to transmit over one or more radio frequency spectrum bands. In some examples, the transmitter 1930 may include an array of transmit antennas. In some examples, the one or more radio frequency spectrum bands may be used for LTE/LTE-A or 5G communications, as described herein. The transmitter 1930 may be used to transmit various types of data or control signals (e.g., transmissions) over one or more communication links (or channels) of a wireless communication system, such as one or more communication links (or channels) of the wireless communication system 100 described with reference to FIG. 1. In some examples, the transmitter 1930 may also or alternatively include one or more wired transmitters.

In some examples, the node controller communication manager 1920-a may be used to manage one or more aspects of wireless communication for the apparatus 1925. In some examples, part of the node controller communication manager 1920-a may be incorporated into or shared with the receiver 1910 or the transmitter 1930. In some examples, the node controller communication manager 1920-a may be an example of aspects of the node controller communication manager 1920 described with reference to FIG. 1. In some examples, the node controller communication manager 1920-a may include an AS security mode manager 1935, an AS key manager 1940, or a UE communication manager 1945.

The AS security mode manager 1935 may be used to determine an AS security mode for a UE. The AS security mode may indicate an AS protocol layer for protecting data packets transmitted to or received from the UE. In some examples, the AS security mode may be determined based at least in part on a connection request received from the UE and/or an identified AS security capability of the UE. In some examples, the AS security mode for the UE may be additionally or alternatively determined based at least in part on: a load on at least one computational resource, or a usage level of at least one communication link, or an identification of an attack, or a throughput of at least one communication link, or a combination thereof. In some examples, the AS security mode may include at least one of a PDCP layer security mode, or an RLC layer security mode, or a MAC layer security mode, or a combination thereof.

The AS key manager 1940 may be used to derive an AS key for the UE based at least in part on the AS security mode. The UE communication manager 1945 may be used to transmit (e.g., in cooperation with the transmitter 1930), to the UE, an AS security indication identifying the AS security mode.

Figure 20:
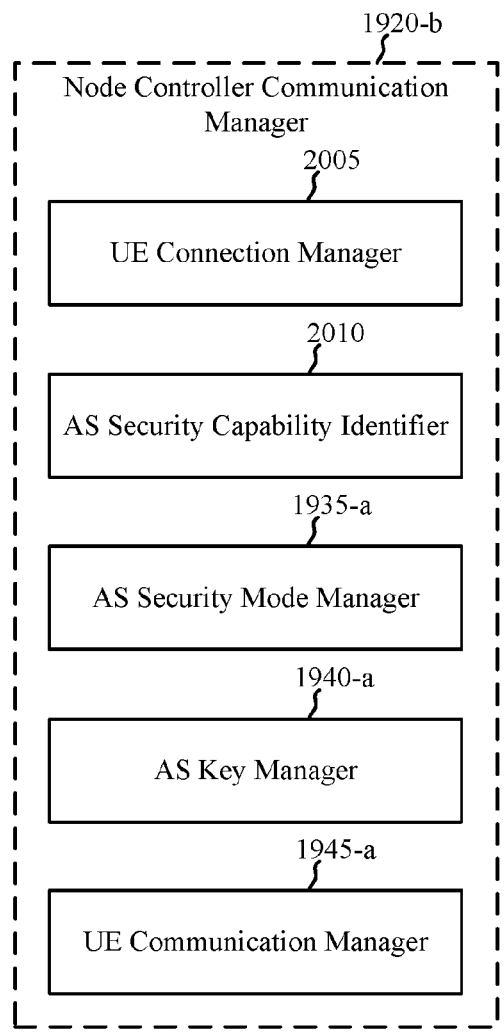
FIG. 20 shows a block diagram of a node controller communication manager that supports configurable AS security, in accordance with various aspects of the present disclosure.

FIG. 20 shows a block diagram 2000 of a node controller communication manager 1920-b that supports configurable AS security, in accordance with various aspects of the present disclosure. The node controller communication manager 1920-b may be an example of aspects of the node controller communication managers 1920 described with reference to FIG. 1 or 19.

The components of the node controller communication manager 1920-b may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the node controller communication manager 1920-b may be used to manage one or more aspects of wireless communication for a network node 135 described with reference to FIGS. 1-14, including, for example, aspects of one or more of the network access device controllers 125 described with reference to FIG. 1-9 or 11-14, or one of the apparatus 1925 described with reference to FIG. 19. In some examples, part of the node controller communication manager 1920-b may be incorporated into or shared with a receiver or a transmitter (e.g., the receiver 1910 or the transmitter 1930 described with reference to FIG. 19). In some examples, the node controller communication manager 1920-b may include a UE connection manager 2005, an AS security capability identifier 2010, an AS security mode manager 1935-a, an AS key manager 1940-a, or a UE communication manager 1945-a.

The UE connection manager 2005 may be used to receive (e.g., in cooperation with a receiver) a connection request from a UE (e.g., as a result of the UE performing a random access procedure), or to initiate a handover of the UE from a first serving network access device for the UE to a second serving network access device for the UE. In some examples, a connection request from the UE may be received through a network access device.

The AS security capability identifier 2010 may be used to identify an AS security capability of the UE. In some examples, the AS security capability may be received from the UE with a connection request. The AS security capability may include, in some examples, at least one of a PDCP layer security capability, or an RLC layer security capability, or a MAC layer security capability, or a combination thereof. The AS security indication may also indicate a type of AS security protection, in which the type of AS security protection may include ciphering for data packets, integrity protection for data packets, or a combination thereof. The AS security indication could also indicate no AS security protection for data packets.

The AS security mode manager 1935-a may be used to determine an AS security mode for a UE. The AS security mode may indicate an AS protocol layer for protecting data packets transmitted to or received from the UE. In some examples, the AS security mode may be determined based at least in part on a connection request received from the UE and/or an identified AS security capability of the UE. In some examples, the AS security mode for the UE may be additionally or alternatively determined based at least in part on: a load on at least one computational resource, or a usage level of at least one communication link, or an identification of an attack, or a throughput of at least one communication link, or a combination thereof. In some examples, the AS security mode may include at least one of a PDCP layer security mode, or an RLC layer security mode, or a MAC layer security mode, or a combination thereof.

In one example, the AS key manager 1940-a may be used to derive a UE-specific AS key for the UE based at least in part on the AS security mode, and to transmit (e.g., in cooperation with a transmitter) the UE-specific AS key to the serving network access device for the UE.

In another example, the AS key manager 1940-a may be used to derive a network access device-specific AS key based at least in part on the AS security mode. The AS key manager 1940-a may also be used to derive a UE-specific AS key for the UE based at least in part on the network access device-specific AS key. The AS key manager 1940-a may also be used to transmit (e.g., in cooperation with a transmitter) the network access device-specific AS key to the serving network access device for the UE, and to transmit the UE-specific AS key to the UE. Because the network access device-specific AS key is not UE-specific, the AS key manager 1940-a may not derive or transmit a network access device specific AS-key for every establishment of a connection by a UE. In some examples, the AS key manager 1940-a may transmit the network access device-specific AS key to each network access device in a group of network access devices. In some examples, the UE connection manager 2005 may initiate a handover of the UE from the first serving network access device for the UE to a second serving network access device for the UE, and the AS key manager 1940-a may transmit the network access device-specific AS key to the second serving network access device for the UE. In some examples, the AS key manager 1940-a may derive the UE-specific AS key for the UE and the network access device-specific AS key based at least in part on a pair of related indices, and signal a key rollover to the first serving network access device and the UE based at least in part on an update to the pair of related indices.

The UE communication manager 1945-a may be used to transmit (e.g., in cooperation with a transmitter), to the UE, an AS security indication identifying the AS security mode. In some examples, the AS security indication may be transmitted with an AS key for the UE.

Figure 21:
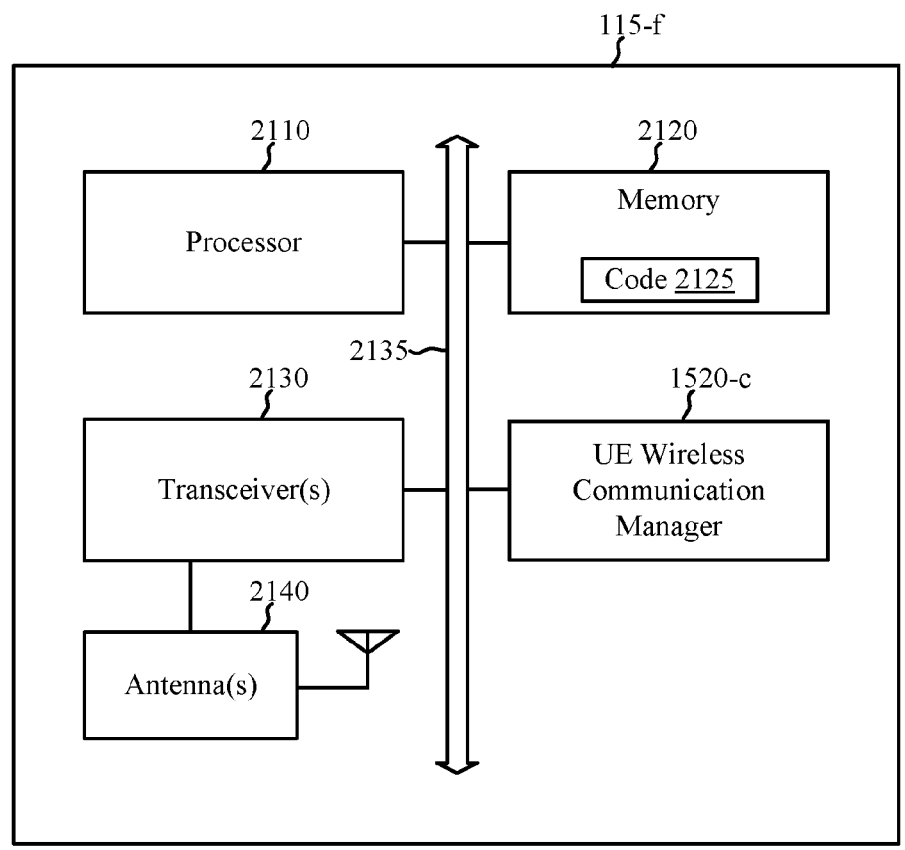
FIG. 21 shows a block diagram of a UE that supports configurable AS security, in accordance with various aspects of the present disclosure.

FIG. 21 shows a block diagram 2100 of a UE 115-f that supports configurable AS security, in accordance with various aspects of the present disclosure. The UE 115-f may be included or be part of a personal computer (e.g., a laptop computer, a netbook computer, a tablet computer, etc.), a cellular telephone, a PDA, a DVR, an internet appliance, a gaming console, an e-reader, a vehicle, an IoT device, a home appliance, a lighting or alarm control system, etc. The UE 115-f may, in some examples, have an internal power supply (not shown), such as a battery, to facilitate mobile operation. In some examples, the UE 115-f may be an example of aspects of one or more of the UEs 115 described with reference to FIG. 1, 2, 11, 12A, 12B, 13, or 14, or aspects of the apparatus 1515 described with reference to FIG. 15. The UE 115-f may be configured to implement or process at least some of the UE or apparatus techniques and functions described with reference to FIGS. 1-16.

The UE 115-f may include a processor 2110, a memory 2120, at least one transceiver (represented by transceiver(s) 2130), at least one antenna (represented by antenna(s) 2140), or a UE wireless communication manager 1520-c. Each of these components may be in communication with each other, directly or indirectly, over one or more buses 2135.

The memory 2120 may include random access memory (RAM) or read-only memory (ROM). The memory 2120 may store computer-readable, computer-executable code 2125 containing instructions that are configured to, when executed, cause the processor 2110 to perform various functions described herein related to wireless communication and/or configuring AS security protection for data packets, including, for example, at least some of the UE techniques and functions described with reference to FIGS. 1-16. Alternatively, the computer-executable code 2125 may not be directly executable by the processor 2110 but be configured to cause the UE 115-f (e.g., when compiled and executed) to perform various of the functions described herein.

The processor 2110 may include an intelligent hardware device (e.g., a central processing unit (CPU), a microcontroller, an ASIC, etc.). The processor 2110 may process information received through the transceiver(s) 2130 or information to be sent to the transceiver(s) 2130 for transmission through the antenna(s) 2140. The processor 2110 may handle, alone or in connection with the UE wireless communication manager 1520-c, various aspects of communicating over (or managing communications over) one or more radio frequency spectrum bands.

The transceiver(s) 2130 may include a modem configured to modulate packets and provide the modulated packets to the antenna(s) 2140 for transmission, and to demodulate packets received from the antenna(s) 2140. The transceiver(s) 2130 may, in some examples, be implemented as one or more transmitters and one or more separate receivers. The transceiver(s) 2130 may support communications in one or more radio frequency spectrum bands. The transceiver(s) 2130 may be configured to communicate bi-directionally, via the antenna(s) 2140, with one or more of the network nodes 135, including network access devices 105 (e.g., RHs) described with reference to FIGS. 1-9, and 11-14, or one or more of the apparatuses 1705 described with reference to FIG. 17. While the UE 115-*f* may include a single antenna, there may be examples in which the UE 115-*f* may include multiple antennas 2140.

The UE wireless communication manager 1520-*c* may be configured to perform or control some or all of the UE or apparatus techniques or functions described with reference to FIGS. 1-16 related to wireless communication over one or more radio frequency spectrum bands and/or configuring AS security protection for data packets. The UE wireless communication manager 1520-*c*, or portions of it, may include a processor, or some or all of the functions of the UE wireless communication manager 1520-*c* may be performed by the processor 2110 or in connection with the processor 2110. In some examples, the UE wireless communication manager 1520-*c* may be an example of the UE wireless communication managers 1520 described with reference to FIG. 1, 15, or 16.

Figure 22:
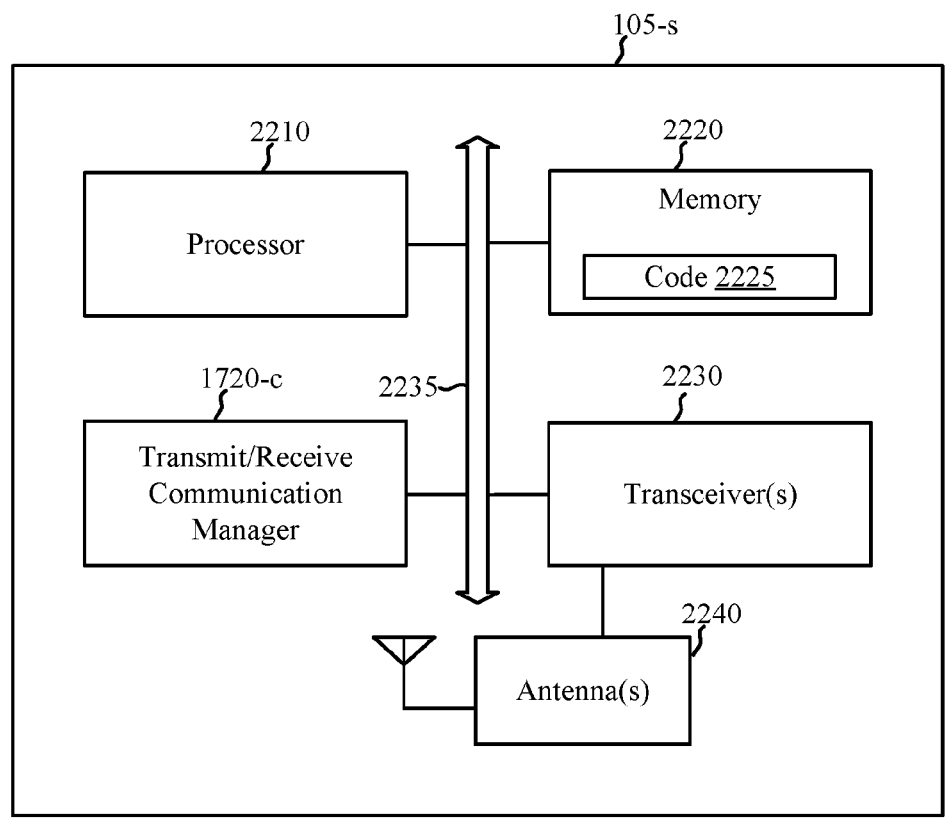
FIG. 22 shows a block diagram of a network access device that supports configurable AS security, in accordance with various aspects of the present disclosure.

FIG. 22 shows a block diagram 2200 of a network access device 105-*s* (e.g., an RH) that supports configurable AS security, in accordance with various aspects of the present disclosure. In some examples, the network access device 105-*s* may be an example of aspects of one or more of the network access devices (e.g. RHs) 105 described with reference to FIG. 1-9, or 11-14, or aspects of the apparatus 1705 described with reference to FIG. 17. The network access device 105-*s* may be configured to implement or process at least some of the network access device, RH or apparatus techniques and functions described with reference to FIG. 1-14, 17, or 18.

The network access device 105-*s* may include a processor 2210, a memory 2220, at least one transceiver (represented by transceiver(s) 2230), at least one antenna (represented by antenna(s) 2240), or a transmit/receive communication manager 1720-*c*. Each of these components may be in communication with each other, directly or indirectly, over one or more buses 2235.

The memory 2220 may include RAM or ROM. The memory 2220 may store computer-readable, computer-executable code 2225 containing instructions that are configured to, when executed, cause the processor 2210 to perform various functions described herein related to wireless communication and/or configuring AS security protection for data packets transmitted to or received from a UE, including, for example, at least some of the network access device, RH, or apparatus techniques and functions described with reference to FIG. 1-14, 17, or 18. Alternatively, the computer-executable code 2225 may not be directly executable by the processor 2210 but be configured to cause the network access device 105-*s* (e.g., when compiled and executed) to perform various of the functions described herein.

The processor 2210 may include an intelligent hardware device (e.g., a CPU, a microcontroller, an ASIC, etc.). The processor 2210 may process information received through the transceiver(s) 2230 or information to be sent to the transceiver(s) 2230 for transmission through the antenna(s) 2240. The processor 2210 may handle, alone or in connection with the transmit/receive communication manager 1720-*c*, various aspects of communicating over (or managing communications over) one or more radio frequency spectrum bands.

The transceiver(s) 2230 may include a modem configured to modulate packets and provide the modulated packets to the antenna(s) 2240 for transmission, and to demodulate packets received from the antenna(s) 2240. The transceiver(s) 2230 may, in some examples, be implemented as one or more transmitters and one or more separate receivers. The transceiver(s) 2230 may support communications in one or more radio frequency spectrum bands. The transceiver(s) 2230 may be configured to communicate bi-directionally, via the antenna(s) 2240, with one or more of the UEs 115 described with reference to FIG. 1, 2, 11, 12A, 12B, 13, 14, or 21, or one or more of the apparatuses 1515 described with reference to FIG. 15. While the network access device 105-*s* may include a single antenna, there may be examples in which the network access device 105-*s* may include multiple antennas 2240.

The transmit/receive communication manager 1720-*c* may be configured to perform or control some or all of the network access device, RH, or apparatus techniques or functions described with reference to FIG. 1-14, 17, or 18 related to wireless communication over one or more radio frequency spectrum bands and/or configuring AS security protection for data packets transmitted to or received from a UE. The transmit/receive communication manager 1720-*c* may also be used to manage communications with a network access device controller (e.g., an ANC) 125 associated with the network access device 105-*s*. The communications with the network access device controller may be over wired or wireless communication links, for example, depending on implementation. The transmit/receive communication manager 1720-*c*, or portions of it, may include a processor, or some or all of the functions of the transmit/receive communication manager 1720-*c* may be performed by the processor 2210 or in connection with the processor 2210. In some examples, the transmit/receive communication manager 1720-*c* may be an example of the transmit/receive communication managers 1720 described with reference to FIG. 1, 17, or 18.

Figure 23:
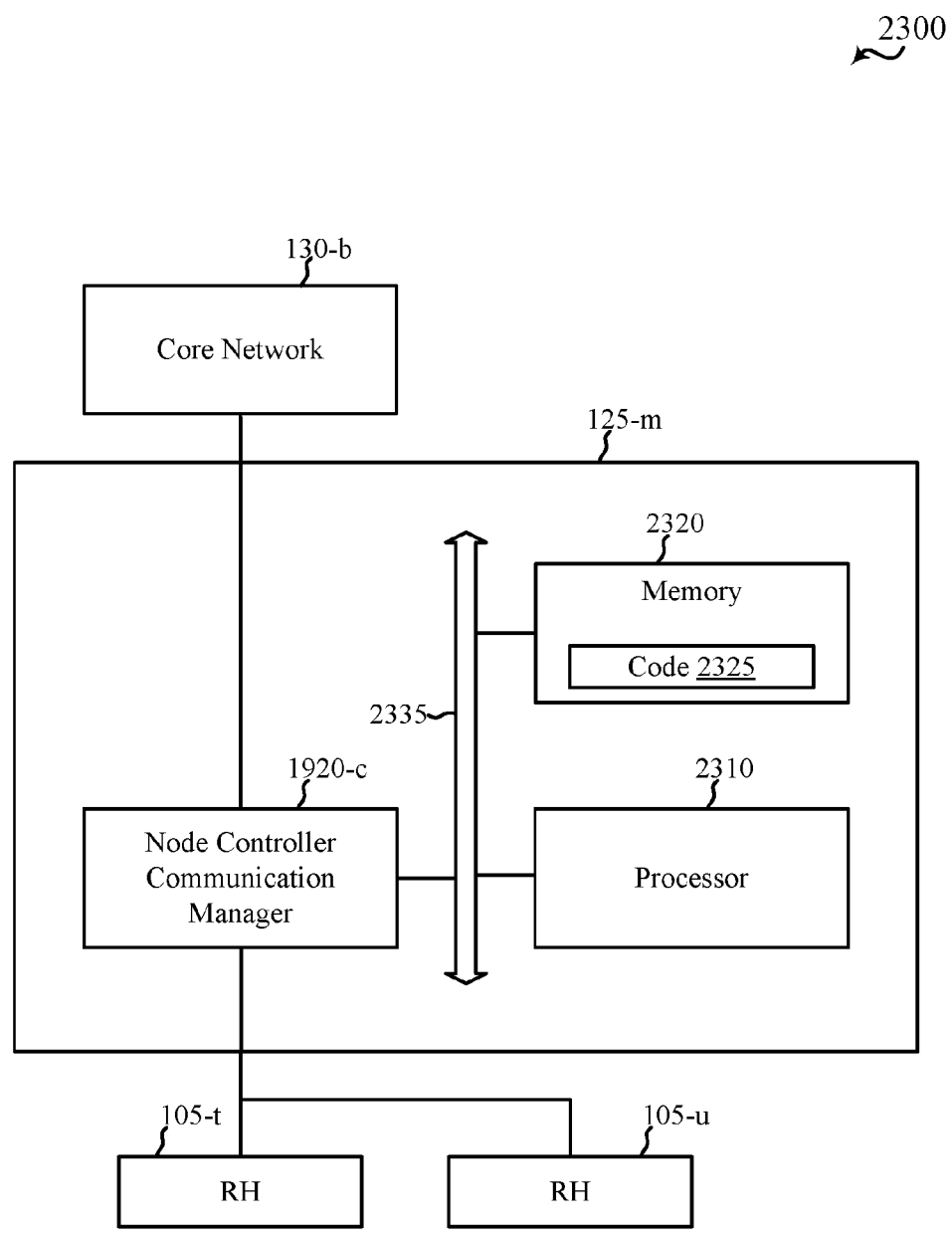
FIG. 23 shows a block diagram of a network access device controller that supports configurable AS security, in accordance with various aspects of the present disclosure.

FIG. 23 shows a block diagram 2300 of a network access device controller 125-*m* (e.g., an ANC) that supports configurable AS security, in accordance with various aspects of the present disclosure. In some examples, the network access device controller 125-*m* may be an example of aspects of one or more aspects of the network access device controllers 125 described with reference to FIG. 1-9 or 11-14, or aspects of the apparatus 1925 described with reference to FIG. 19. The network access device controller 125-*m* may be configured to implement or process at least some of the network access device controller, ANC, or apparatus techniques and functions described with reference to FIG. 1-14, 19, or 20.

The network access device controller 125-*m* may include a processor 2310, a memory 2320, or a node controller communication manager 1920-*c*. Each of these components may be in communication with each other, directly or indirectly, over one or more buses 2335.

The memory 2320 may include RAM or ROM. The memory 2320 may store computer-readable, computer-executable code 2325 containing instructions that are configured to, when executed, cause the processor 2310 to perform various functions described herein related to wireless communication and/or AS security management, including, for example, at least some of the network access device controller, ANC, or apparatus techniques and functions described with reference to FIG. 1-14, 19, or 20. Alternatively, the computer-executable code 2325 may not be directly executable by the processor 2310 but be configured to cause the network access device controller 125-*m* (e.g., when compiled and executed) to perform various of the functions described herein.

The processor 2310 may include an intelligent hardware device, e.g., a CPU, a microcontroller, an ASIC, etc. The processor 2310 may process information received through the node controller communication manager 1920-*c* from a core network 130-*b*, or from one or more network access devices 105 (e.g., from a first network access device (e.g., RH) 105-*t* or a second network access device (e.g., RH) 105-*u*) or other network access device controllers 125. The processor 2310 may also process information to be sent to the node controller communication manager 1920-*c* for transmission to the core network 130-*b*, or for transmission to one or more network access devices 105 (e.g., to the network access device 105-*t* or the second network access device 105-*u*) or other network access device controllers. The processor 2310 may handle, alone or in connection with the node controller communication manager 1920-*c*, various aspects of communicating over (or managing communications over) one or more radio frequency spectrum bands.

The node controller communication manager 1920-*c* may be configured to perform or control some or all of the network access device controller or apparatus techniques or functions described with reference to FIG. 1-14, 19, or 20 related to wireless communication over one or more radio frequency spectrum bands and/or AS security management. The node controller communication manager 1920-*c* may also be used to manage communications with a network (e.g., a core network, such as the core network 130-*b*), one or more network access devices (e.g., the first network access device 105-*t* or the second network access device 105-*u*), or one or more other network access device controllers. The communications with the network, network access devices, or other network access controllers may be over wired or wireless communication links, for example, depending on implementation. The node controller communication manager 1920-*c*, or portions of it, may include a processor, or some or all of the functions of the node controller communication manager 1920-*c* may be performed by the processor 2310 or in connection with the processor 2310. In some examples, the node controller communication manager 1920-*c* may be an example of the node controller communication manager 1920 described with reference to FIG. 1, 19, or 20.

Figure 24:
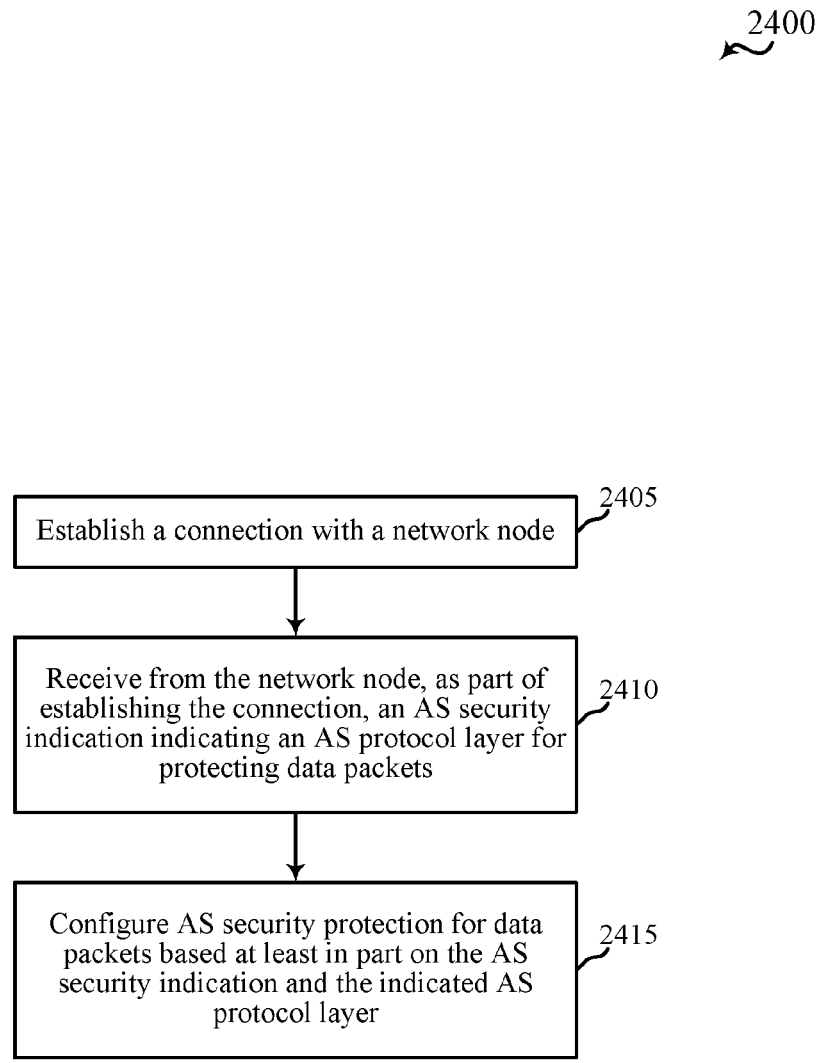
FIGS. 24 and 25 are flow charts illustrating examples of methods that may be performed by UEs that support configurable AS security, in accordance with various aspects of the present disclosure.

FIG. 24 is a flow chart illustrating an example of a method 2400 that may be performed by a UE that supports configurable AS security, in accordance with various aspects of the present disclosure. For clarity, the method 2400 is described below with reference to aspects of one or more of the UEs 115 described with reference to FIG. 1, 2, 10, 11, 12A, 12B, 13, 14, or 21, or aspects of the apparatus 1515 described with reference to FIG. 15, or aspects of the UE wireless communication manager 1520 described with reference to FIG. 1, 15, 16, or 21. In some examples, a UE may execute one or more sets of codes to control the functional elements of the UE to perform the functions described below. Additionally or alternatively, the UE may perform one or more of the functions described below using special-purpose hardware.

At block 2405, the method 2400 may include establishing a connection with a network node. In some examples, the network node may include one of the network nodes 135 described with reference to FIGS. 1-14. In some examples, the connection with the network node may be established through a network access device of the network node (e.g., one of the network access devices (e.g., RHs) 105 described with reference to FIG. 1-9, 11-14, 22, or 23, or a network access device including the apparatus 1705 described with reference to FIG. 17, or one of the transmit/receive communication managers 1720 described with reference to FIG. 1, 17, 18, or 22). The operation(s) at block 2405 may be performed using a UE wireless communication manager 1520 described with reference to FIG. 1, 15, 16, or 21, or a network connection manager 1535 described with reference to FIG. 15 or 16, which may perform operations in cooperation with a transmitter or receiver, such as a receiver 1510 or a transmitter 1530 described with reference to FIG. 15, or transceiver(s) 2130 described with reference to FIG. 21.

In some examples of the method 2400, establishing the connection with the network node may include performing a random access procedure, and the operation(s) at block 2405 may include transmitting to the network node, while performing the random access procedure, a connection request. In other examples of the method 2400, the connection with the network node may be established during a handover of the UE from a first network access device to a second network access device.

In some examples, the operation(s) at block 2405 may include transmitting to the network node, as part of establishing the connection, an indication of an AS security capability of the UE. In some examples, the indication of the AS security capability may be transmitted to the network node with a connection request. The indication of the AS security capability may indicate, in some examples, at least one of a PDCP layer security capability, or an RLC layer security capability, or a MAC layer security capability, or a combination thereof.

At block 2410, the method 2400 may include receiving from the network node, as part of establishing the connection with the network node, an AS security indication indicating an AS protocol layer for protecting data packets. In some examples, the AS security indication may indicate at least one of a PDCP layer security, or an RLC layer security, or a MAC layer security, or a combination thereof. In some examples, the AS protocol layer indicated by the AS security indication may be based at least in part on an AS security capability of the UE. The operation(s) at block 2410 may be performed using a UE wireless communication manager 1520 described with reference to FIG. 1, 15, 16, or 21, or an AS security information manager 1540 described with reference to FIG. 15 or 16 which may perform operations in cooperation with a receiver, such as a receiver 1510 described with reference to FIG. 15, or transceiver(s) 2130 described with reference to FIG. 21.

At block 2415, the method 2400 may include configuring AS security protection for data packets based at least in part on the AS security indication and the indicated AS protocol layer. In some examples, configuring AS security protection for data packets may include configuring ciphering for data packets, configuring integrity protection for data packets, or a combination thereof. Configuring AS security protection could also include configuring no AS security protection for data packets. In some examples, the type of AS protection configured for data packets may be based at least in part on a type of AS security protection indicated in the AS security indication. The operation(s) at block 2415 may be performed using a UE wireless communication manager 1520 described with reference to FIG. 1, 15, 16, or 21, or an AS security configuration manager 1545 described with reference to FIG. 15 or 16.

Thus, the method 2400 may provide for wireless communication. It should be noted that the method 2400 is just one implementation and that the operations of the method 2400 may be rearranged or otherwise modified such that other implementations are possible. For example, certain described operations may be optional (e.g., those enclosed by boxes having dashed lines, those described as optional, etc.), wherein optional operations may be performed when certain criteria are met, performed based on a configuration, omitted intermittently, omitted entirely, etc.

Figure 25:
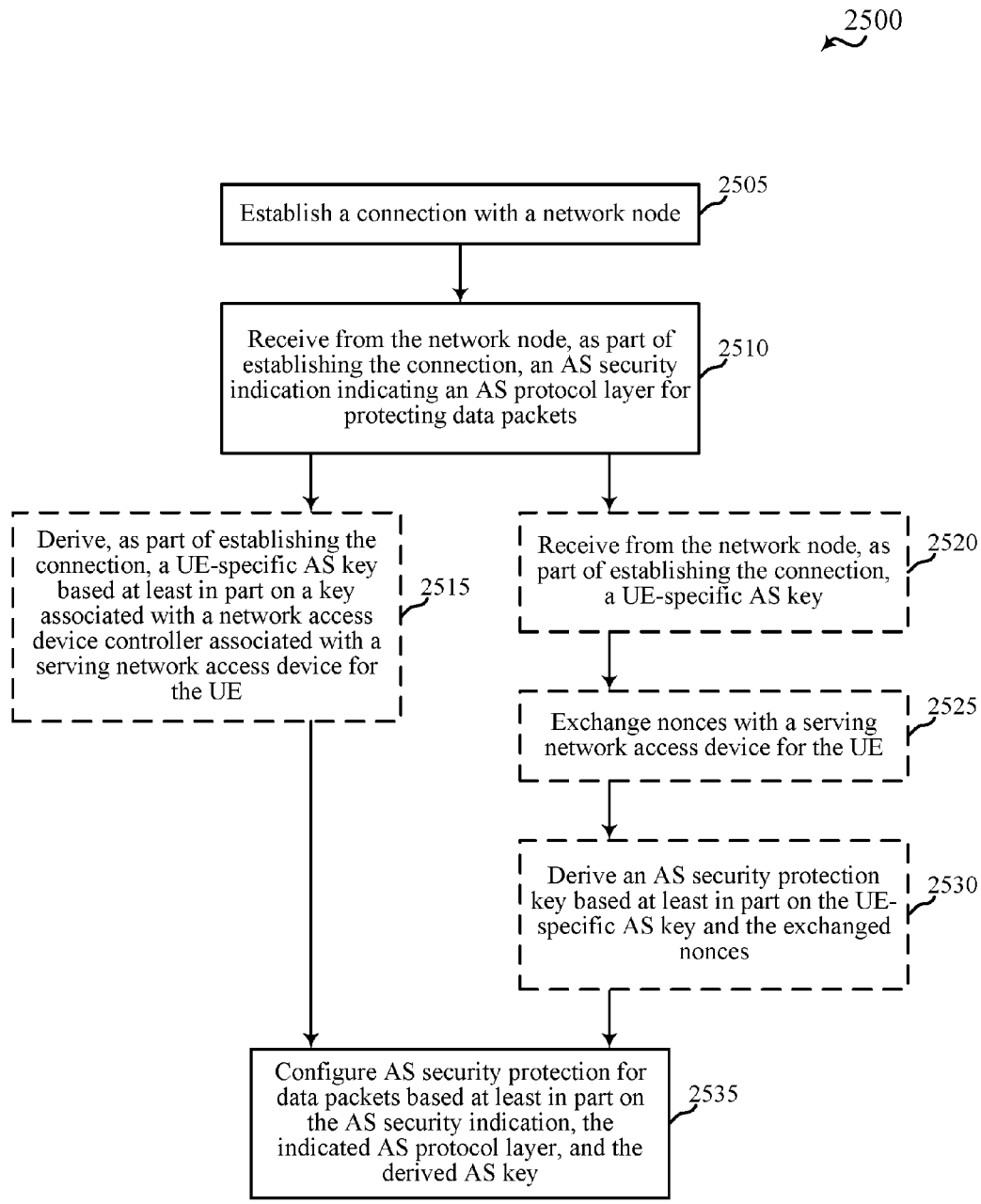

FIG. 25 is a flow chart illustrating an example of a method 2500 that may be performed by a UE that supports configurable AS security, in accordance with various aspects of the present disclosure. For clarity, the method 2500 is described below with reference to aspects of one or more of the UEs 115 described with reference to FIG. 1, 2, 13, 14, or 21, or aspects of the apparatus 1515 described with reference to FIG. 15, or aspects of the UE wireless communication managers 1520 described with reference to FIG. 1, 15, 16, or 21. In some examples, a UE may execute one or more sets of codes to control the functional elements of the UE to perform the functions described below. Additionally or alternatively, the UE may perform one or more of the functions described below using special-purpose hardware.

At block 2505, the method 2500 may include establishing a connection with a network node. In some examples, the network node may include one of the network nodes 135 described with reference to FIGS. 1-14. In some examples, the connection with the network node may be established through a network access device of the network node (e.g., one of the network access devices (e.g., RHs) 105 described with reference to FIG. 1-9, 11-14, 22, or 23, or a network access device including the apparatus 1705 or transmit/receive communication manager 1720). The operation(s) at block 2505 may be performed using a UE wireless communication manager 1520 described with reference to FIG. 1, 15, 16, or 21, or a network connection managers 1535 described with reference to FIG. 15 or 16, which may perform operations in cooperation with a transmitter or receiver, such as a receiver 1510 or a transmitter 1530 described with reference to FIG. 15, or transceiver(s) 2130 described with reference to FIG. 21.

In some examples of the method 2500, establishing the connection with the network node may include performing a random access procedure, and the operation(s) at block 2505 may include transmitting to the network node, while performing the random access procedure, a connection request. In other examples of the method 2500, the connection with the network node may be established during a handover of the UE from a first network access device to a second network access device.

In some examples, the operation(s) at block 2505 may include transmitting to the network node, as part of establishing the connection, an indication of an AS security capability of the UE. In some examples, the indication of the AS security capability may be transmitted to the network node with a connection request. The indication of the AS security capability may indicate, in some examples, at least one of a PDCP layer security capability, or an RLC layer security capability, or a MAC layer security capability, or a combination thereof. In some examples, the operation(s) at block 2505 may include transmitting to the network node, as part of establishing the connection, a count of handovers of the UE (e.g., a count of handovers of the UE from one network access device to another network access device) within the network node.

At block 2510, the method 2500 may include receiving from the network node, as part of establishing the connection with the network node, an AS security indication indicating an AS protocol layer for protecting data packets. In some examples, the AS security indication may indicate at least one of a PDCP layer security, or an RLC layer security, or a MAC layer security, or a combination thereof. The AS security indication may also indicate a type of AS security protection, in which the type of AS security protection may include ciphering for data packets, integrity protection for data packets, or a combination thereof. The AS security indication could also indicate no AS security protection for data packets. In some examples, the AS protocol layer indicated by the AS security indication may be based at least in part on an AS security capability of the UE. The operation(s) at block 2510 may be performed using a UE wireless communication manager 1520 described with reference to FIG. 1, 15, 16, or 21, or an AS security information manager 1540 described with reference to FIG. 15 or 16, which may perform operations in cooperation with a receiver, such as a receiver 1510 described with reference to FIG. 15, or transceiver(s) 2130 described with reference to FIG. 21.

Following block 2510, the method 2500 may include performing the operation(s) at block 2515 or performing the operation(s) at blocks 2520, 2525, and 2530, depending on the configurations of the UE and the network node.

At block 2515, the method 2500 may include deriving, as part of establishing the connection, a UE-specific AS key based at least in part on a key associated with a network access device controller associated with a serving network access device for the UE. In some examples, the UE-specific AS key may be further based on an identifier of the serving network access device for the UE and the count of handovers. After establishing the connection with the network node, the count of handovers may be increased (or updated to a next value). The operation(s) at block 2515 may be performed using a UE wireless communication manager 1520 described with reference to FIG. 1, 15, 16, or 21, or a key manager 1605 or handover counter manager 1610 described with reference to FIG. 16.

At block 2520, the method 2500 may include receiving from the network node, as part of establishing the connection, a UE-specific AS key. The UE-specific key may be based at least in part on a key associated with a serving network access device for the UE, and an identifier of the UE. In some examples, the UE-specific AS key may be received along with the AS security indication. At block 2525, the method 2500 may include exchanging nonces with a serving network access device for the UE. At block 2530, the method 2500 may include deriving an AS security protection key based at least in part on the UE-specific AS key and the exchanged nonces. In some examples, a UE-specific AS key may be received at block 2520 in response to the UE performing a random access procedure (e.g., an initial attach to the network node), but not during an intra-network node handover of the UE. In the case of an intra-network node handover of the UE, an AS protection key may be derived (at block 2530) from a UE-specific AS key that was previously received from the network node. The operation(s) at block 2520, 2525, or 2530 may be performed using a UE wireless communication manager 1520 described with reference to FIG. 1, 15, 16, or 21, or a key manager 1605 described with reference to FIG. 16, which may perform operations in cooperation with a transmitter or receiver, such as a receiver 1510 or a transmitter 1530 described with reference to FIG. 15, or transceiver(s) 2130 described with reference to FIG. 21.

At block 2535, the method 2500 may include configuring AS security protection for data packets based at least in part on the AS security indication, the indicated AS protocol layer, and a derived AS key (e.g., the UE-specific AS key derived at block 2515 or the AS security protection key derived at block 2530). In some examples, configuring AS security protection for data packets may include configuring ciphering for data packets, configuring integrity protection for data packets, or a combination thereof. Configuring AS security protection could also include configuring no AS security protection for data packets. In some examples, the type of AS protection configured for data packets may be based at least in part on a type of AS security protection indicated in the AS security indication. In some examples, the operation(s) at block 2535 may include synchronizing an uplink data packet counter and a downlink data packet counter with the serving network access device. The uplink data packet counter and the downlink data packet counter may be maintained at the PDCP layer, or the RLC layer, or the MAC layer, in accordance with the AS security indication. The operation(s) at block 2535 may be performed using a UE wireless communication manager 1520 described with reference to FIG. 1, 15, 16, or 21, or an AS security configuration manager 1545 described with reference to FIG. 15 or 16.

Thus, the method 2500 may provide for wireless communication. It should be noted that the method 2500 is just one implementation and that the operations of the method 2500 may be rearranged or otherwise modified such that other implementations are possible. For example, certain described operations may be optional (e.g., those enclosed by boxes having dashed lines, those described as optional, etc.), wherein optional operations may be performed when certain criteria are met, performed based on a configuration, omitted intermittently, omitted entirely, etc.

Figure 26:
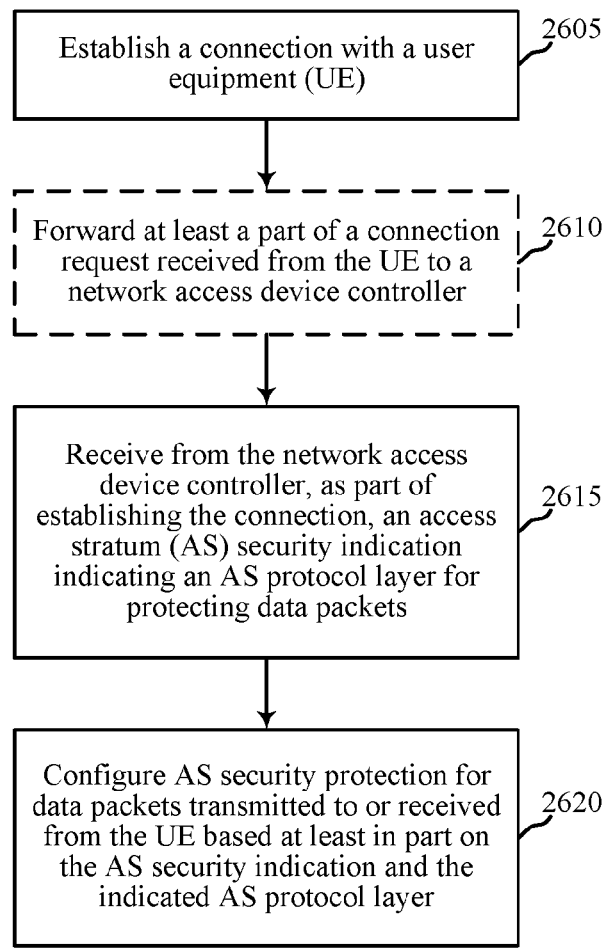
FIGS. 26 and 27 are flow charts illustrating examples of methods that may be performed by network access devices that support configurable AS security, in accordance with various aspects of the present disclosure.

FIG. 26 is a flow chart illustrating an example of a method 2600 that may be performed by a network access device that supports configurable AS security, in accordance with various aspects of the present disclosure. For clarity, the method 2600 is described below with reference to aspects of one or more of the network access devices 105 described with reference to FIG. 1-9, 11-14, 22, or 23, or aspects of the apparatus 1705 described with reference to FIG. 17, or aspects of the transmit/receive communication managers 1720 described with reference to FIG. 1, 17, 18, or 22. In some examples, a network access device may execute one or more sets of codes to control the functional elements of the network access device to perform the functions described below. Additionally or alternatively, the network access device may perform one or more of the functions described below using special-purpose hardware.

At block 2605, the method 2600 may include establishing a connection with a UE. The operation(s) at block 2605 may be performed using a transmit/receive communication manager 1720 described with reference to FIG. 1, 17, 18, or 22, or a UE connection manager 1735 described with reference to FIG. 17 or 18, which may perform operations in cooperation with a transmitter or receiver, such as a receiver 1710 or a transmitter 1730 described with reference to FIG. 17, or transceiver(s) 2230 described with reference to FIG. 22.

In some examples of the method 2600, the connection with the UE may be established in response to receiving a connection request from the UE. In some examples, the connection request may be received while the UE is performing a random access procedure with the network access device. In other examples of the method 2600, the connection with the UE may be established during a handover of the UE to the network access device.

In some examples, the operation(s) at block 2605 may include receiving from the UE, as part of establishing the connection with the UE, an indication of an AS security capability of the UE. In some examples, the indication of the AS security capability may be received from the UE with a connection request. The indication of the AS security capability may indicate, in some examples, at least one of a PDCP layer security capability, or an RLC layer security capability, or a MAC layer security capability, or a combination thereof.

At block 2610, and when the network access device has received a connection request from the UE, the method 2600 may optionally include forwarding at least a part of the connection request (e.g., an identity of the UE, an indication of an AS security capability of the UE, and/or a count of handovers of the UE within a network node to which the network access device belongs) to a network access device controller. In some examples, the network access device controller may be one of the network access device controllers (e.g., ANCs) 125 described with reference to FIG. 1-9, 11-14, or 23, or a network access device controller including the apparatus 1925 described with reference to FIG. 19, or one of the node controller communication managers 1920 described with reference to FIG. 1, 19, 20, or 23). The operation(s) at block 2610 may be performed using a transmit/receive communication manager 1720 described with reference to FIG. 1, 17, 18, or 22, or a UE connection manager 1735 described with reference to FIG. 17 or 18, which may perform operations in cooperation with a transmitter, such as a transmitter 1730 described with reference to FIG. 17, or transceiver(s) 2230 described with reference to FIG. 22.

At block 2615, the method 2600 may include receiving from the network access device controller, as part of establishing the connection with the UE, an AS security indication indicating an AS protocol layer for protecting data packets. In some examples, the AS security indication may indicate at least one of a PDCP layer security, or an RLC layer security, or a MAC layer security, or a combination thereof. In some examples, the AS protocol layer indicated by the AS security indication may be based at least in part on an AS security capability of the UE. The operation(s) at block 2615 may be performed using a transmit/receive communication manager 1720 described with reference to FIG. 1, 17, 18, or 22, or an AS security information manager 1740 described with reference to FIG. 17 or 18, which may perform operations in cooperation with a receiver, such as a receiver 1710 described with reference to FIG. 17, or transceiver(s) 2230 described with reference to FIG. 22.

In some examples of the method 2600, the AS security indication received at block 2615 may be received with a connection response from the network access device controller (e.g., a response to receiving at least part of a connection request forwarded to the network access device controller). In other examples of the method 2600, the AS security indication may be received from the network access device controller during a handover of the UE to the network access device.

At block 2620, the method 2600 may include configuring AS security protection for data packets transmitted to or received from the UE based at least in part on the AS security indication and the indicated AS protocol layer. In some examples, configuring AS security protection for data packets may include configuring ciphering for data packets, configuring integrity protection for data packets, or a combination thereof. Configuring AS security protection could also include configuring no AS security protection for data packets. In some examples, the type of AS protection configured for data packets may be based at least in part on a type of AS security protection indicated in the AS security indication. In some examples, configuring AS security protection for data packets may include forwarding the AS security indication received at block 2615, or forwarding at least a part of a connection response received from the network access device controller (e.g., at least the AS security indication received at block 2615), to the UE. The operation(s) at block 2620 may be performed using a transmit/receive communication manager 1720 described with reference to FIG. 1, 17, 18, or 22, or an AS security configuration manager 1745 described with reference to FIG. 17 or 18.

Thus, the method 2600 may provide for wireless communication. It should be noted that the method 2600 is just one implementation and that the operations of the method 2600 may be rearranged or otherwise modified such that other implementations are possible. For example, certain described operations may be optional (e.g., those enclosed by boxes having dashed lines, those described as optional, etc.), wherein optional operations may be performed when certain criteria are met, performed based on a configuration, omitted intermittently, omitted entirely, etc.

Figure 27:
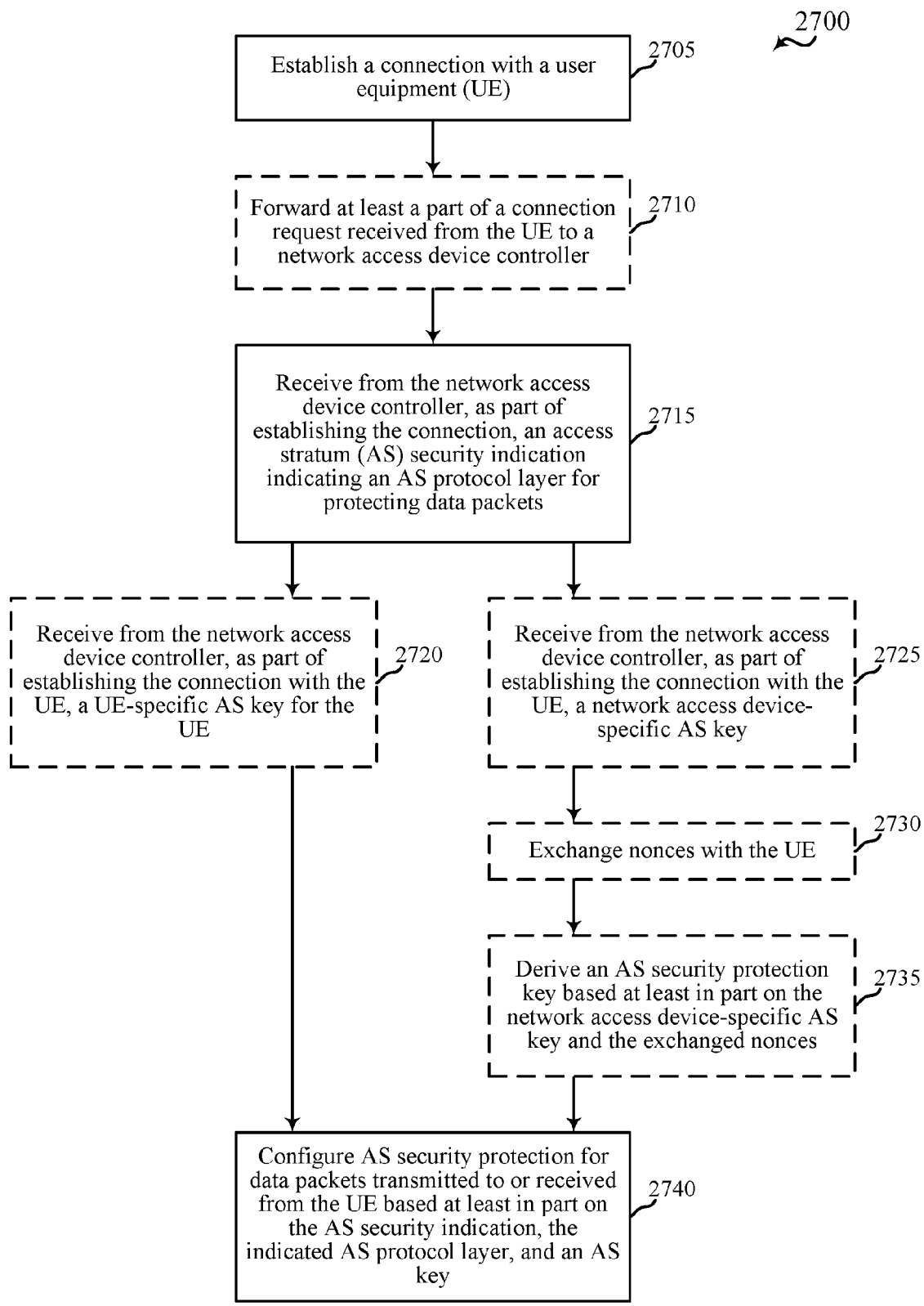

FIG. 27 is a flow chart illustrating an example of a method 2700 that may be performed by a network access device that supports configurable AS security, in accordance with various aspects of the present disclosure. For clarity, the method 2700 is described below with reference to aspects of one or more of the network access devices 105 described with reference to FIG. 1-9, 11-14, 17, 18, or 22, or aspects of the apparatus 1705 described with reference to FIG. 17, or aspects of the transmit/receive communication managers 1720 described with reference to FIG. 1, 17, 18, or 22. In some examples, a network access device may execute one or more sets of codes to control the functional elements of the network access device to perform the functions described below. Additionally or alternatively, the network access device may perform one or more of the functions described below using special-purpose hardware.

At block 2705, the method 2700 may include establishing a connection with a UE. The operation(s) at block 2705 may be performed using a transmit/receive communication manager 1720 described with reference to FIG. 1, 17, 18, or 22, or a UE connection manager 1735 described with reference to FIG. 17 or 18, which may perform operations in cooperation with a transmitter or receiver, such as a receiver 1710 or a transmitter 1730 described with reference to FIG. 17, or transceiver(s) 2230 described with reference to FIG. 22.

In some examples of the method 2700, the connection with the UE may be established in response to receiving a connection request from the UE. In some examples, the connection request may be received while the UE is performing a random access procedure with the network access device. In other examples of the method 2700, the connection with the UE may be established during a handover of the UE to the network access device.

In some examples, the operation(s) at block 2705 may include receiving from the UE, as part of establishing the connection with the UE, an indication of an AS security capability of the UE. In some examples, the indication of the AS security capability may be received from the UE with a connection request. The indication of the AS security capability may indicate, in some examples, at least one of a PDCP layer security capability, or an RLC layer security capability, or a MAC layer security capability, or a combination thereof. The AS security indication may also indicate a type of AS security protection, in which the type of AS security protection may include ciphering for data packets, integrity protection for data packets, or a combination thereof. The AS security indication could also indicate no AS security protection for data packets.

At block 2710, and when the network access device has received a connection request from the UE, the method 2700 may optionally include forwarding at least a part of the connection request (e.g., an identity of the UE, an indication of an AS security capability of the UE, and/or a count of handovers of the UE within a network node to which the network access device belongs) to the network access device controller. The operation(s) at block 2710 may be performed using a transmit/receive communication manager 1720 described with reference to FIG. 1, 17, 18, or 22, or a UE connection manager 1735 described with reference to FIG. 17 or 18, which may perform operations in cooperation with a transmitter, such as a transmitter 1730 described with reference to FIG. 17, or transceiver(s) 2230 described with reference to FIG. 22.

At block 2715, the method 2700 may include receiving from the network access device controller, as part of establishing the connection with the UE, an AS security indication indicating an AS protocol layer for protecting data packets. In some examples, the AS security indication may indicate at least one of a PDCP layer security, or an RLC layer security, or a MAC layer security, or a combination thereof. In some examples, the AS protocol layer indicated by the AS security indication may be based at least in part on an AS security capability of the UE. The operation(s) at block 2715 may be performed using a transmit/receive communication manager 1720 described with reference to FIG. 1, 17, 18, or 22, or an AS security information manager 1740 described with reference to FIG. 17 or 18, which may perform operations in cooperation with a receiver, such as a receiver 1710 described with reference to FIG. 17, or transceiver(s) 2230 described with reference to FIG. 22.

In some examples of the method 2700, the AS security indication received at block 2715 may be received with a connection response from the network access device controller (e.g., a response to receiving at least part of a connection request forwarded to the network access device controller). In other examples of the method 2700, the AS security indication may be received from the network access device controller during a handover of the UE to the network access device.

Following block 2715, the method 2700 may include performing the operation(s) at block 2720 or performing the operation(s) at blocks 2725, 2730, and 2735, depending on the configurations of the network access device controller, the network access device, and the UE.

At block 2720, the method 2700 may include receiving from the network access device controller, as part of establishing the connection with the UE, a UE-specific AS key for the UE. In some examples, the UE-specific AS key may be based at least in part on a key associated with the network access device controller, an identifier of the network access device, and a count of handovers. The operation(s) at block 2720 may be performed using a transmit/receive communication manager 1720 described with reference to FIG. 1, 17, 18, or 22, or a key manager 1805 described with reference to FIG. 18, which may perform operations in cooperation with a receiver, such as a receiver 1710 described with reference to FIG. 17, or transceiver(s) 2230 described with reference to FIG. 22.

At block 2725, the method 2700 may include receiving from the network access device controller, a network access device-specific AS key. The network access device-specific AS key may be received as part of establishing the connection with the UE, or at a time prior to establishing the connection with the UE. The network access device-specific key may be based at least in part on a key associated with the network access device controller. At block 2730, the method 2700 may include exchanging nonces with the UE.

At block 2735, the method 2700 may include deriving an AS security protection key based at least in part on the UE-specific AS key and the exchanged nonces. The operation(s) at block 2725, 2730, or 2735 may be performed using a transmit/receive communication manager 1720 described with reference to FIG. 1, 17, 18, or 22, or a key manager 1805 described with reference to FIG. 18, which may perform operations in cooperation with a receiver, such as a receiver 1710 described with reference to FIG. 17, or transceiver(s) 2230 described with reference to FIG. 22.

At block 2740, the method 2700 may include configuring AS security protection for data packets transmitted to or received from the UE based at least in part on the AS security indication, the indicated AS protocol layer, and an AS key (e.g., the UE-specific AS key received at block 2720 or the AS security protection key derived at block 2735). In some examples, configuring AS security protection for data packets may include configuring ciphering for data packets, configuring integrity protection for data packets, or a combination thereof. Configuring AS security protection could also include configuring no AS security protection for data packets. In some examples, the type of AS protection configured for data packets may be based at least in part on a type of AS security protection indicated in the AS security indication.

In some examples, configuring AS security protection for data packets may include forwarding the AS security indication received at block 2715, or forwarding at least a part of a connection response received from the network access device controller (e.g., at least the AS security indication received at block 2715), to the UE. In some examples, the operation(s) at block 2740 may include synchronizing an uplink data packet counter and a downlink data packet counter with the UE. The uplink data packet counter and the downlink data packet counter may be maintained at the PDCP layer, or the RLC layer, or the MAC layer, in accordance with the AS security indication received from the network access device controller. The operation(s) at block 2740 may be performed using a transmit/receive communication manager 1720 described with reference to FIG. 1, 17, 18, or 22, or an AS security configuration manager 1745 described with reference to FIG. 17 or 18.

Thus, the method 2700 may provide for wireless communication. It should be noted that the method 2700 is just one implementation and that the operations of the method 2700 may be rearranged or otherwise modified such that other implementations are possible. For example, certain described operations may be optional (e.g., those enclosed by boxes having dashed lines, those described as optional, etc.), wherein optional operations may be performed when certain criteria are met, performed based on a configuration, omitted intermittently, omitted entirely, etc.

Figure 28:
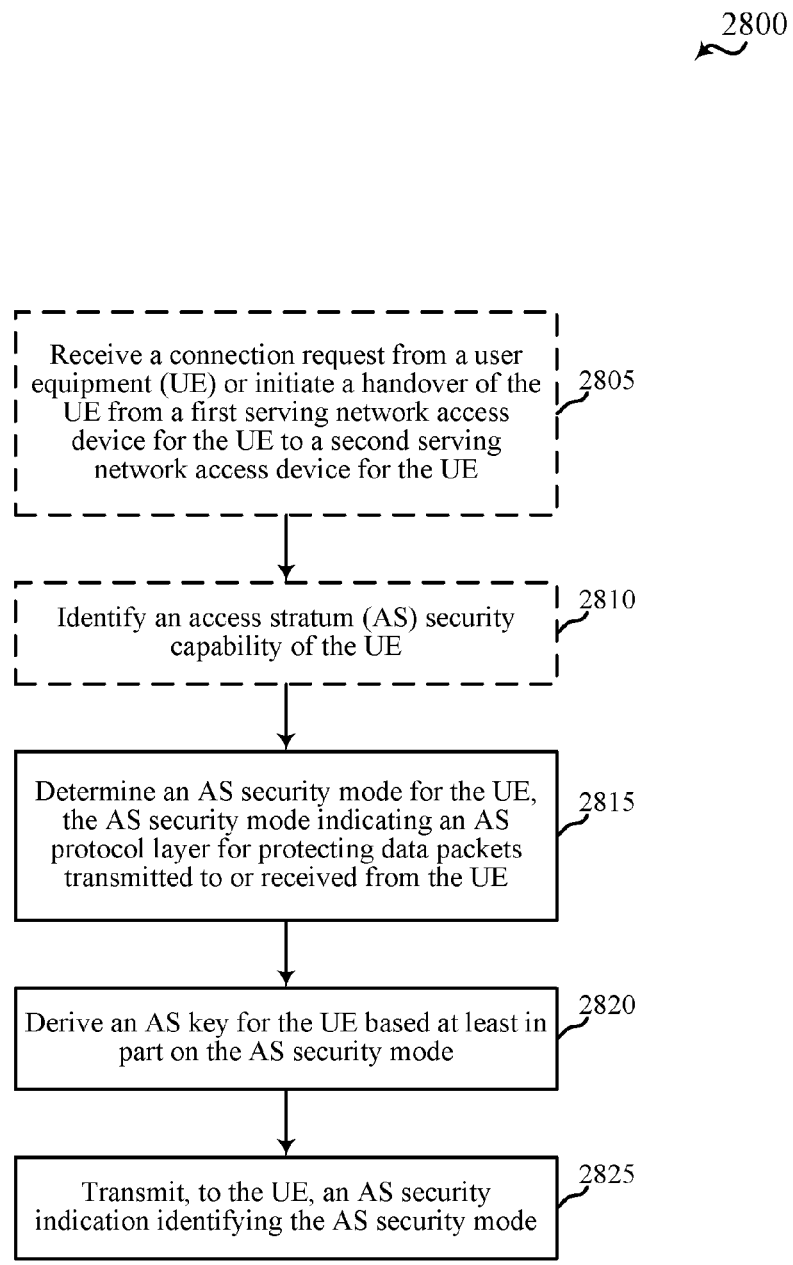
FIGS. 28 and 29 are flow charts illustrating examples of methods that may be performed by network access device controllers that support configurable AS security, in accordance with various aspects of the present disclosure.

FIG. 28 is a flow chart illustrating an example of a method 2800 that may be performed by a network access device controller that supports configurable AS security, in accordance with various aspects of the present disclosure. For clarity, the method 2800 is described below with reference to aspects of one or more of the network access device controllers 125 described with reference to FIG. 1-9, 11-14, 19, 20, or 23, or aspects of the apparatus 1925 described with reference to FIG. 19, or aspects of the node controller communication managers 1920 described with reference to FIG. 1, 19, 20, or 23. In some examples, a network access device controller may execute one or more sets of codes to control the functional elements of the network access device controller to perform the functions described below. Additionally or alternatively, the network access device controller may perform one or more of the functions described below using special-purpose hardware.

At block 2805, the method 2800 may optionally include receiving a connection request from a UE (e.g., as a result of the UE performing a random access procedure), or initiating a handover of the UE from a first serving network access device for the UE to a second serving network access device for the UE. In some examples, a connection request from the UE may be received through a network access device. The operation(s) at block 2805 may be performed using a node controller communication manager 1920 described with reference to FIG. 1, 19, 20, or 23, or a UE connection manager 2005 described with reference to FIG. 20, which may perform operations in cooperation with a transmitter or receiver, such as a receiver 1910 or a transmitter 1930 described with reference to FIG. 19, or transceiver(s) 2330 described with reference to FIG. 23.

At block 2810, the method 2800 may optionally include identifying an AS security capability of the UE. In some examples, the AS security capability may be received from the UE with a connection request. The AS security capability may include, in some examples, at least one of a PDCP layer security capability, or an RLC layer security capability, or a MAC layer security capability, or a combination thereof. The operation(s) at block 2810 may be performed using a node controller communication manager 1920 described with reference to FIG. 1, 19, 20, or 23, or an AS security capability identifier 2010 described with reference to FIG. 20.

At block 2815, the method 2800 may include determining an AS security mode for a UE. The AS security mode may indicate an AS protocol layer for protecting data packets transmitted to or received from the UE. In some examples, the AS security mode may be determined based at least in part on a connection request received from the UE and/or an identified AS security capability of the UE. In some examples, the AS security mode for the UE may be additionally or alternatively determined based at least in part on: a load on at least one computational resource, or a usage level of at least one communication link, or an identification of an attack, or a throughput of at least one communication link, or a combination thereof. In some examples, the AS security mode may include at least one of a PDCP layer security mode, or an RLC layer security mode, or a MAC layer security mode, or a combination thereof. The operation(s) at block 2815 may be performed using a node controller communication manager 1920 described with reference to FIG. 1, 19, 20, or 23, or an AS security mode manager 1935 described with reference to FIG. 19 or 20.

At block 2820, the method 2800 may include deriving an AS key for the UE based at least in part on the AS security mode. The operation(s) at block 2820 may be performed using a node controller communication manager 1920 described with reference to FIG. 1, 19, 20, or 23, or an AS key manager 1940 described with reference to FIG. 19 or 20.

At block 2825, the method 2800 may include transmitting, to the UE, an AS security indication identifying the AS security mode. The operation(s) at block 2825 may be performed using a node controller communication manager 1920 described with reference to FIG. 1, 19, 20, or 23, or a UE communication manager 1945 described with reference to FIG. 19 or 20, which may perform operations in cooperation with a transmitter, such as a transmitter 1930 described with reference to FIG. 19, or transceiver(s) 2330 described with reference to FIG. 23.

Thus, the method 2800 may provide for wireless communication. It should be noted that the method 2800 is just one implementation and that the operations of the method 2800 may be rearranged or otherwise modified such that other implementations are possible. For example, certain described operations may be optional (e.g., those enclosed by boxes having dashed lines, those described as optional, etc.), wherein optional operations may be performed when certain criteria are met, performed based on a configuration, omitted intermittently, omitted entirely, etc.

Figure 29:
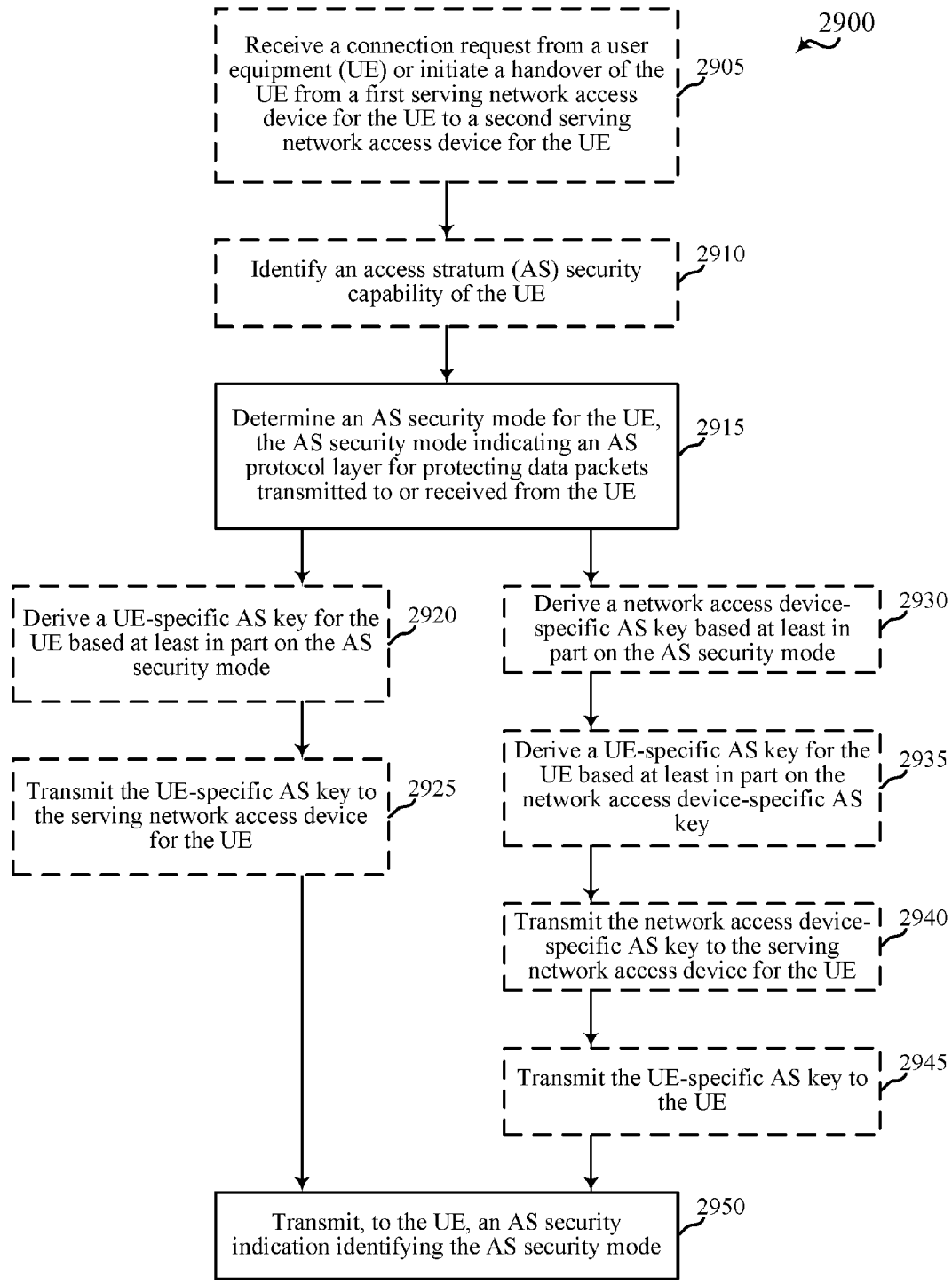

FIG. 29 is a flow chart illustrating an example of a method 2900 that may be performed by a network access device controller that supports configurable AS security, in accordance with various aspects of the present disclosure. For clarity, the method 2900 is described below with reference to aspects of one or more of the network access device controllers 125 described with reference to FIG. 1-9, 11-14, 19, 20, or 23, or aspects of the apparatus 1925 described with reference to FIG. 19, or aspects of the node controller communication managers 1920 described with reference to FIG. 1, 19, 20, or 23. In some examples, a network access device controller may execute one or more sets of codes to control the functional elements of the network access device controller to perform the functions described below. Additionally or alternatively, the network access device controller may perform one or more of the functions described below using special-purpose hardware.

At block 2905, the method 2900 may optionally include receiving a connection request from a UE (e.g., as a result of the UE performing a random access procedure), or initiating a handover of the UE from a first serving network access device for the UE to a second serving network access device for the UE. In some examples, a connection request from the UE may be received through a network access device. The operation(s) at block 2915 may be performed using a node controller communication manager 1920 described with reference to FIG. 1, 19, 20, or 23, or a UE connection manager 2005 described with reference to FIG. 20, which may perform operations in cooperation with a transmitter or receiver, such as a receiver 1910 or a transmitter 1930 described with reference to FIG. 19, or transceiver(s) 2330 described with reference to FIG. 23.

At block 2910, the method 2900 may optionally include identifying an AS security capability of the UE. In some examples, the AS security capability may be received from the UE with a connection request. The AS security capability may include, in some examples, at least one of a PDCP layer security capability, or an RLC layer security capability, or a MAC layer security capability, or a combination thereof. The AS security indication may also indicate a type of AS security protection, in which the type of AS security protection may include ciphering for data packets, integrity protection for data packets, or a combination thereof. The AS security indication could also indicate no AS security protection for data packets. The operation(s) at block 2910 may be performed using a node controller communication manager 1920 described with reference to FIG. 1, 19, 20, or 23, or an AS security capability identifier 2010 described with reference to FIG. 20.

At block 2915, the method 2900 may include determining an AS security mode for a UE. The AS security mode may indicate an AS protocol layer for protecting data packets transmitted to or received from the UE. In some examples, the AS security mode may be determined based at least in part on a connection request received from the UE and/or an identified AS security capability of the UE. In some examples, the AS security mode for the UE may be additionally or alternatively determined based at least in part on: a load on at least one computational resource, or a usage level of at least one communication link, or an identification of an attack, or a throughput of at least one communication link, or a combination thereof. In some examples, the AS security mode may include at least one of a PDCP layer security mode, or an RLC layer security mode, or a MAC layer security mode, or a combination thereof. The operation(s) at block 2915 may be performed using a node controller communication manager 1920 described with reference to FIG. 1, 19, 20, or 23, or an AS security mode manager 1935 described with reference to FIG. 19 or 20.

Following block 2915, the method 2900 may include performing the operation(s) at blocks 2920 and 2925 or performing the operation(s) at blocks 2930, 2935, 2940, and 2945, depending on the configurations of the network access device controller, a serving network access device for the UE, and the UE.

At block 2920, the method 2900 may include deriving a UE-specific AS key for the UE based at least in part on the AS security mode. At block 2925, the method 2900 may include transmitting the UE-specific AS key to the serving network access device for the UE. The operation(s) at blocks 2920 and 2925 may be performed using a node controller communication manager 1920 described with reference to FIG. 1, 19, 20, or 23, or an AS key manager 1940 described with reference to FIG. 19 or 20, which may perform operations in cooperation with a transmitter, such as a transmitter 1930 described with reference to FIG. 19, or transceiver(s) 2330 described with reference to FIG. 23.

At block 2930, the method 2900 may include deriving a network access device-specific AS key based at least in part on the AS security mode. At block 2935, the method 2900 may include deriving a UE-specific AS key for the UE based at least in part on the network access device-specific AS key. At block 2940, the method 2900 may include transmitting the network access device-specific AS key to the serving network access device for the UE. At block 2945, the method 2900 may include transmitting the UE-specific AS key to the UE. Because the network access device-specific AS key is not UE-specific, the operation(s) at blocks 2930 and 2940 may not be performed when the network access device specific AS-key has already been derived and transmitted to the serving network access device for the UE. The operation(s) at blocks 2930, 2935, 2940, and 2945 may be performed using a node controller communication manager 1920 described with reference to FIG. 1, 19, 20, or 23, or an AS key manager 1940 described with reference to FIG. 19 or 20, which may perform operations in cooperation with a transmitter, such as a transmitter 1930 described with reference to FIG. 19, or transceiver(s) 2330 described with reference to FIG. 23.

At block 2950, the method 2900 may include transmitting, to the UE, an AS security indication identifying the AS security mode. In some examples, the AS security indication may be transmitted with an AS key for the UE. The operation(s) at block 2950 may be performed using a node controller communication manager 1920 described with reference to FIG. 1, 19, 20, or 23, or a UE communication manager 1945 described with reference to FIG. 19 or 20.

In some examples, the method 2900 may include transmitting the network access device-specific AS key to each network access device in a group of network access devices.

In some examples, the method 2900 may include initiating a handover of the UE from the first serving network access device for the UE to a second serving network access device for the UE, and transmitting the network access device-specific AS key to the second serving network access device for the UE.

In some examples, the method 2900 may include deriving the UE-specific AS key for the UE and the network access device-specific AS key based at least in part on a pair of related indices, and signaling a key rollover to the first serving network access device and the UE based at least in part on an update to the pair of related indices.

Thus, the method 2900 may provide for wireless communication. It should be noted that the method 2900 is just one implementation and that the operations of the method 2900 may be rearranged or otherwise modified such that other implementations are possible. For example, certain described operations may be optional (e.g., those enclosed by boxes having dashed lines, those described as optional, etc.), wherein optional operations may be performed when certain criteria are met, performed based on a configuration, omitted intermittently, omitted entirely, etc.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   establishing a connection with a network node;
   receiving from the network node, as part of establishing the connection, an access stratum (AS) security indication indicating one of a plurality of AS protocol layers for protecting data packets; and
   configuring AS security protection for data packets based at least in part on the AS security indication, the AS security protection to be processed on the indicated one of the plurality of AS protocol layers.

2. The method of claim 1, further comprising:
   transmitting to the network node, as part of establishing the connection, an indication of an AS security capability of the UE.

3. The method of claim 2, wherein the indication of the AS security capability comprises an indication of at least one of:
   a capability of processing AS security on a packet data convergence protocol (PDCP) layer, or a capability of processing AS security on a radio link control (RLC) layer, or a capability of processing AS security on a medium access control (MAC) layer, or a combination thereof.

4. The method of claim 1, further comprising:
   deriving, as part of establishing the connection, a UE-specific AS key based at least in part on a key associated with a network access device controller associated with a serving network access device for the UE; and
   configuring the AS security protection for data packets based at least in part on the UE-specific AS key.

5. The method of claim 4, further comprising:
   transmitting to the network node, as part of establishing the connection, a count of handovers of the UE within the network node; and
   increasing the count of handovers after establishing the connection.

6. The method of claim 5, wherein the UE-specific AS key is further based at least in part on an identifier of the serving network access device for the UE and the count of handovers.

7. The method of claim 1, further comprising:
   receiving from the network node, as part of establishing the connection, a UE-specific AS key.

8. The method of claim 7, further comprising:
   exchanging nonces with a serving network access device for the UE;
   deriving an AS security protection key based at least in part on the UE-specific AS key and the exchanged nonces; and
   configuring the AS security protection for data packets based at least in part on the AS security protection key.

9. The method of claim 7, wherein the UE-specific AS key is based at least in part on a key associated with a serving network access device for the UE, and an identifier of the UE.

10. The method of claim 1, wherein the AS security indication indicates at least one of a packet data convergence protocol (PDCP) layer for processing AS security, or a radio link control (RLC) layer for processing AS security, or a medium access control (MAC) layer for processing AS security, the method further comprising:
    synchronizing an uplink data packet counter and a downlink data packet counter with a serving network access device, the uplink data packet counter and the downlink data packet counter maintained at the indicated PDCP layer, or the indicated RLC layer, or the indicated MAC layer, in accordance with the AS security indication.

11. The method of claim 1, wherein configuring AS security protection for data packets comprises:
    exchanging nonces with the network node.

12. The method of claim 1, wherein establishing the connection with the network node comprises performing a random access procedure, the method further comprising:
    transmitting to the network node, while performing the random access procedure, a connection request.

13. The method of claim 1, wherein the connection with the network node is established during a handover of the UE from a first network access device to a second network access device.

14. The method of claim 1, wherein the AS security protection for data packets comprises:
    ciphering for data packets on the indicated one of the plurality of AS protocol layers, or integrity protection for data packets on the indicated one of the plurality of AS protocol layers, or a combination thereof.

15. The method of claim 14, wherein the AS security indication further indicates a type of AS security protection, the type of AS security protection comprising:
    ciphering for data packets, or integrity protection for data packets, or a combination thereof.

16. An apparatus for wireless communication at a user equipment (UE), comprising:
    a processor; and
    memory in electronic communication with the processor;
    wherein the processor and the memory are configured to:
        establish a connection with a network node;
        receive from the network node, as part of establishing the connection, an access stratum (AS) security indication indicating one of a plurality of AS protocol layers for protecting data packets; and
        configure AS security protection for data packets based at least in part on the AS security indication, the AS security protection to be processed on the indicated one of the plurality of AS protocol layers.

17. A method for configuring access stratum (AS) security, at a network access device, comprising:
- establishing a connection with a user equipment (UE);
- receiving from a network access device controller, as part of establishing the connection, an AS security indication indicating one of a plurality of AS protocol layers for protecting data packets; and
- configuring AS security protection for data packets transmitted to or received from the UE based at least in part on the AS security indication, the AS security protection to be processed on the indicated one of a plurality of AS protocol layers.

18. The method of claim 17, further comprising:
- receiving from the network access device controller, as part of establishing the connection with the UE, a UE-specific AS key for the UE.

19. The method of claim 17, further comprising:
- receiving, from the network access device controller, a network access device-specific AS key.

20. The method of claim 19, further comprising:
- exchanging nonces with the UE;
- deriving an AS security protection key based at least in part on the network access device-specific AS key and the exchanged nonces; and
- configuring the AS security protection for data packets transmitted to or received from the UE based at least in part on the AS security protection key.

21. The method of claim 17, wherein the AS security indication indicates at least one of a packet data convergence protocol (PDCP) layer for processing AS security, or a radio link control (RLC) layer for processing AS security, or a medium access control (MAC) layer for processing AS security, the method further comprising:
- synchronizing an uplink data packet counter and a downlink data packet counter with the UE, the uplink data packet counter and the downlink data packet counter maintained at the indicated PDCP layer, or the indicated RLC layer, or the indicated MAC layer in accordance with the AS security indication.

22. The method of claim 17, further comprising:
- receiving from the UE, as part of establishing the connection with the UE, an indication of an AS security capability of the UE.

23. The method of claim 17, further comprising:
- establishing the connection with the UE in response to receiving a connection request from the UE;
- forwarding at least a part of the connection request to the network access device controller;
- receiving, from the network access device controller, a connection response including the AS security indication; and
- forwarding at least a part of the connection response to the UE.

24. A method for configuring access stratum (AS) security at a network access device controller, comprising:
- determining an AS security mode for a user equipment (UE), the AS security mode indicating one of a plurality of AS protocol layers for protecting data packets transmitted to or received from the UE;
- deriving an AS key for the UE based at least in part on the AS security mode; and
- transmitting, to the UE, an AS security indication identifying the AS security mode.

25. The method of claim 24, further comprising:
- identifying an AS security capability of the UE.

26. The method of claim 24, wherein deriving the AS key for the UE comprises deriving a UE-specific AS key for the UE, the method further comprising:
- transmitting the UE-specific AS key to a serving network access device for the UE.

27. The method of claim 24, wherein deriving the AS key for the UE comprises deriving a UE-specific AS key for the UE, the method further comprising:
- transmitting the UE-specific AS key to the UE.

28. The method of claim 27, further comprising:
- deriving a network access device-specific AS key based at least in part on the AS security mode, wherein the UE-specific AS key for the UE is derived based at least in part on the network access device-specific AS key; and
- transmitting the network access device-specific AS key to a first serving network access device for the UE.

29. The method of claim 28, further comprising:
- initiating a handover of the UE from the first serving network access device for the UE to a second serving network access device for the UE; and
- transmitting the network access device-specific AS key to the second serving network access device for the UE.

30. The method of claim 24, wherein the AS security mode for the UE is determined based at least in part on:
- a load on at least one computational resource, or a usage level of at least one communication link, or an identification of an attack, or a throughput of at least one communication link, or a combination thereof.

* * * * *